United States Patent
Kozakura

(10) Patent No.: US 10,225,452 B2
(45) Date of Patent: Mar. 5, 2019

(54) COMMUNICATION APPARATUS AND METHOD FOR CONTROLLING THE SAME

(71) Applicant: CANON KABUSHIKI KAISHA, Tokyo (JP)

(72) Inventor: Kozue Kozakura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 49 days.

(21) Appl. No.: 15/388,402

(22) Filed: Dec. 22, 2016

(65) Prior Publication Data
US 2017/0187946 A1   Jun. 29, 2017

(30) Foreign Application Priority Data
Dec. 28, 2015   (JP) ................... 2015-257323

(51) Int. Cl.
*H04N 5/232* (2006.01)
*H04N 1/44* (2006.01)
*H04N 1/00* (2006.01)

(52) U.S. Cl.
CPC ..... *H04N 5/23203* (2013.01); *H04N 1/00307* (2013.01); *H04N 1/00413* (2013.01); *H04N 1/00477* (2013.01); *H04N 1/00925* (2013.01); *H04N 1/4433* (2013.01); *H04N 5/23216* (2013.01); *H04N 5/23293* (2013.01); *H04N 5/23296* (2013.01); *H04N 2201/0072* (2013.01); *H04N 2201/0075* (2013.01); *H04N 2201/0084* (2013.01); *H04N 2201/3252* (2013.01); *H04N 2201/3273* (2013.01)

(58) Field of Classification Search
CPC ........... H04N 5/23203; H04N 5/23216; H04N 5/23296; H04N 5/23293; H04N 1/00307; H04N 1/4433; H04N 2201/0084; H04N 2201/0075; H04N 2201/0072
See application file for complete search history.

(56) References Cited

U.S. PATENT DOCUMENTS

2004/0252197 A1*  12/2004  Fraley ................ H04N 5/23203
                                               348/207.1
2007/0126883 A1*   6/2007  Ishige ................ H04N 5/23209
                                               348/211.14
(Continued)

FOREIGN PATENT DOCUMENTS

JP   2014-027338 A   2/2014

*Primary Examiner* — Lin Ye
*Assistant Examiner* — John H. Morehead, III
(74) *Attorney, Agent, or Firm* — Carter, DeLuca, Farrell & Schmidt, LLP

(57) ABSTRACT

A communication apparatus capable of controlling an image capture apparatus is disclosed. The communication apparatus receives live image data from an image capture apparatus in which information regarding a predetermined parameter related to a capturing of the live image is added. When the reception of the live image data is restricted, the communication apparatus restricts an instruction to change the value of the predetermined parameter. This enables to prevent the occurrence of a difference between an actual state of the image capture apparatus and a state assumed by a user of the communication apparatus, in a state where a moving image captured by the image capture apparatus is not displayed on the communication apparatus.

26 Claims, 24 Drawing Sheets

(56) References Cited

U.S. PATENT DOCUMENTS

| | | | |
|---|---|---|---|
| 2011/0043663 A1* | 2/2011 | Tsuchiya | H04N 5/232 348/240.3 |
| 2013/0141640 A1* | 6/2013 | Kim | H04N 5/2254 348/375 |
| 2014/0045481 A1* | 2/2014 | Fraley | H04W 52/0258 455/418 |
| 2014/0078371 A1* | 3/2014 | Kinoshita | H04N 5/23206 348/333.02 |
| 2015/0029379 A1* | 1/2015 | Kim | H04N 1/00347 348/333.01 |
| 2015/0049233 A1* | 2/2015 | Choi | H04N 5/232 348/333.01 |
| 2015/0138374 A1* | 5/2015 | Ito | H04N 5/2353 348/207.1 |
| 2015/0146021 A1* | 5/2015 | Nishiguchi | H04N 5/23203 348/207.1 |
| 2015/0172530 A1* | 6/2015 | Shintani | H04N 1/00307 348/211.8 |
| 2015/0172531 A1* | 6/2015 | Ikeda | H04N 5/23206 348/207.11 |
| 2015/0237249 A1* | 8/2015 | Sato | H04N 5/23203 348/207.11 |
| 2015/0237250 A1* | 8/2015 | Shinozaki | H04N 5/23203 348/211.1 |
| 2015/0264202 A1* | 9/2015 | Pawlowski | H04N 1/00106 348/207.11 |
| 2015/0304574 A1* | 10/2015 | Yanagi | H04N 5/23203 348/158 |

* cited by examiner

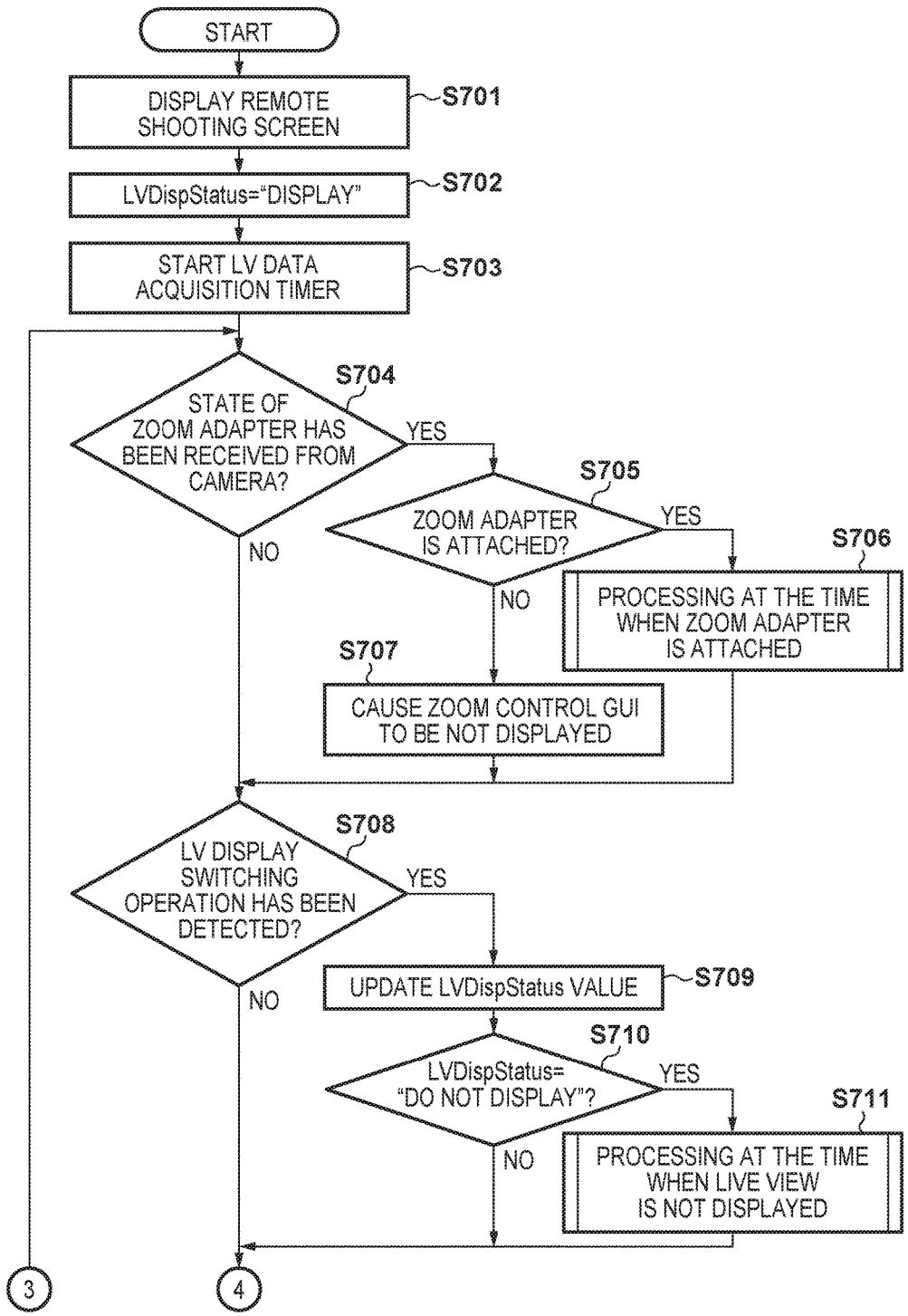

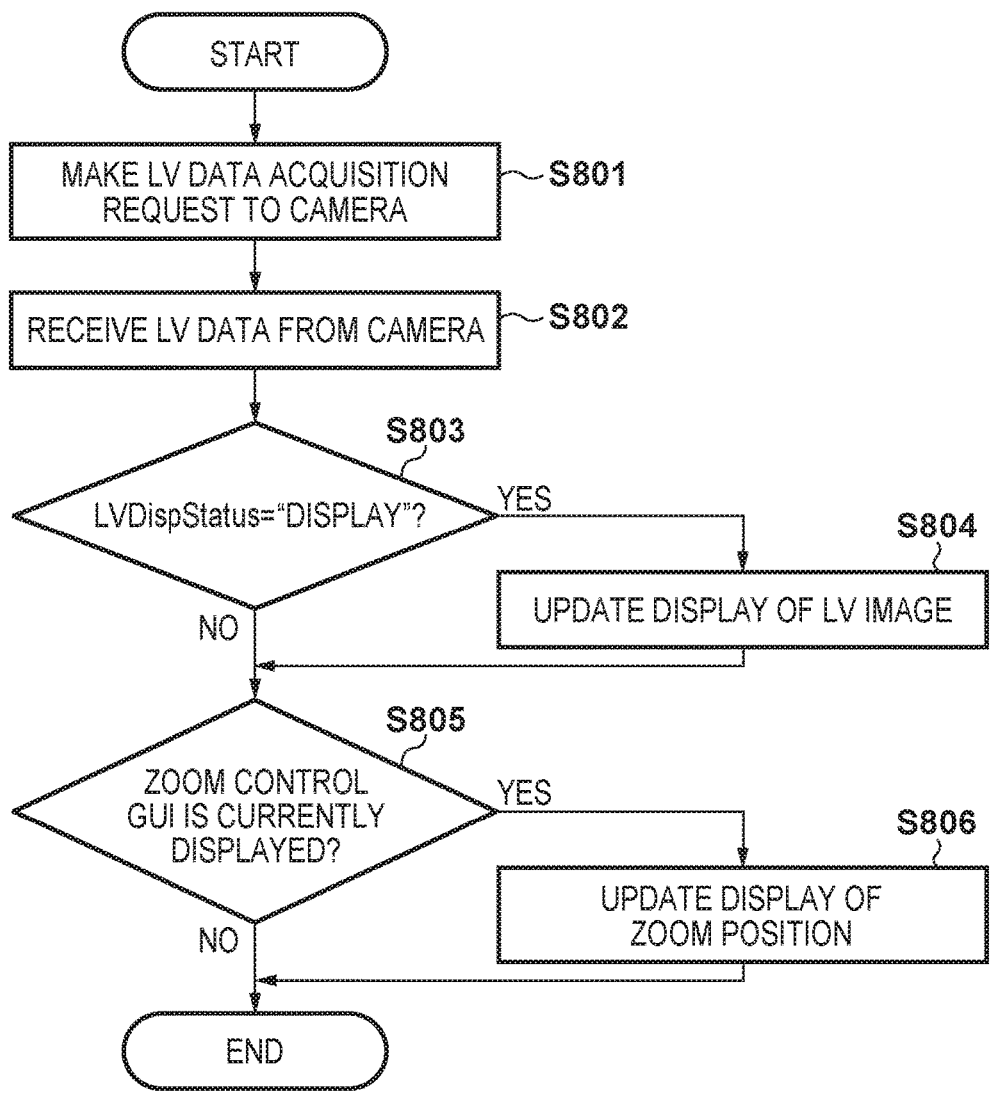

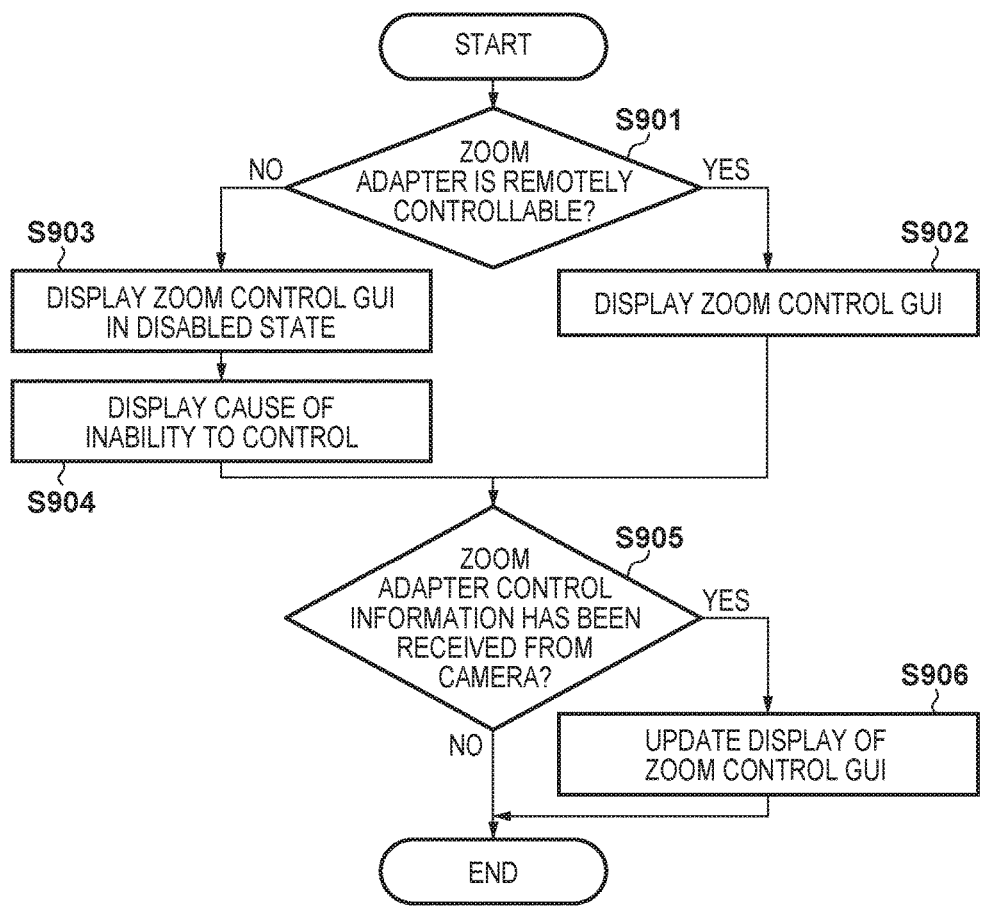
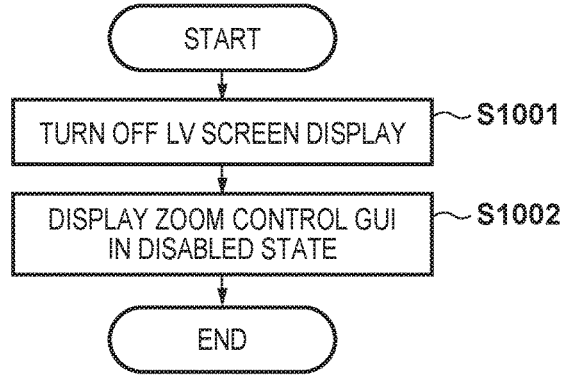

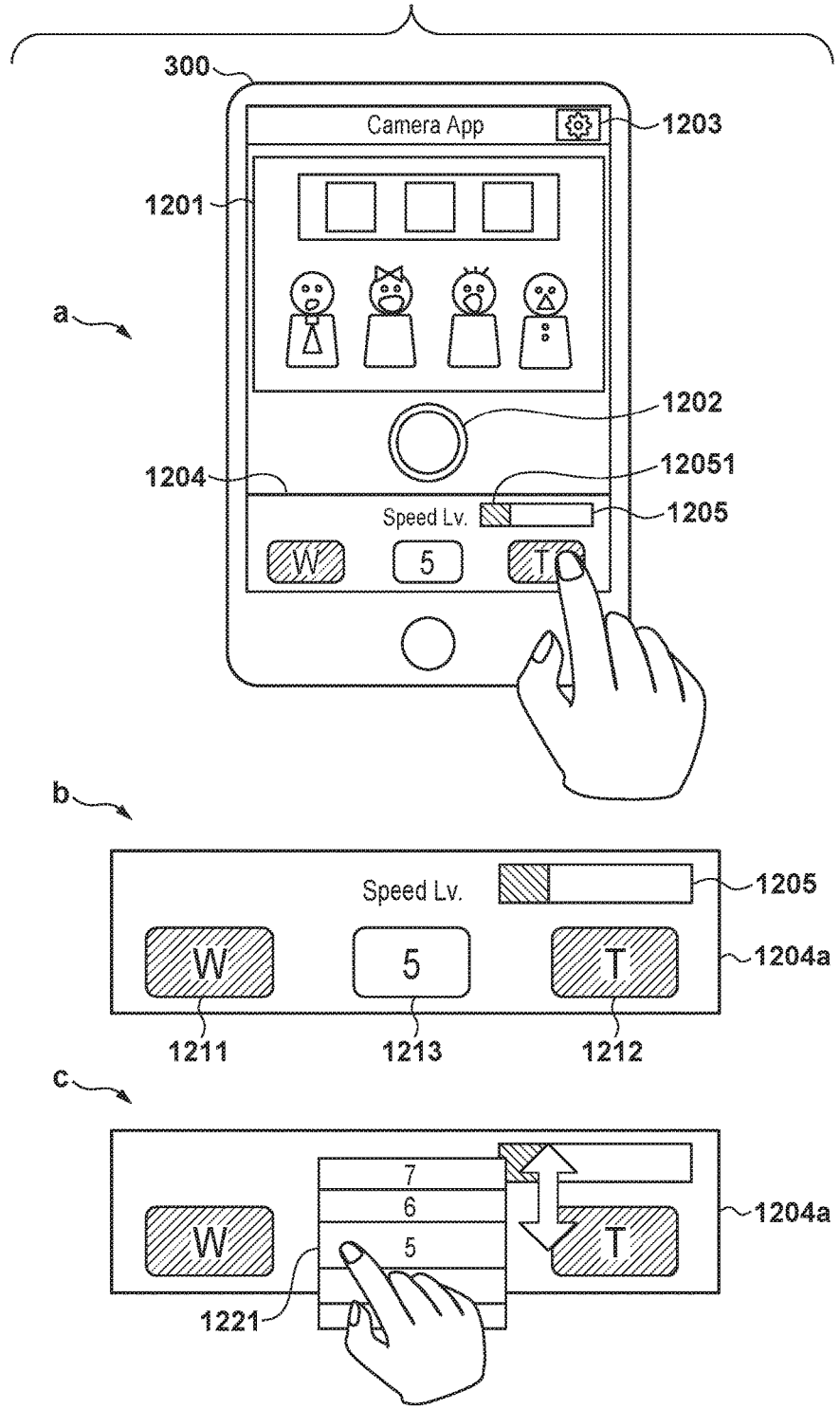

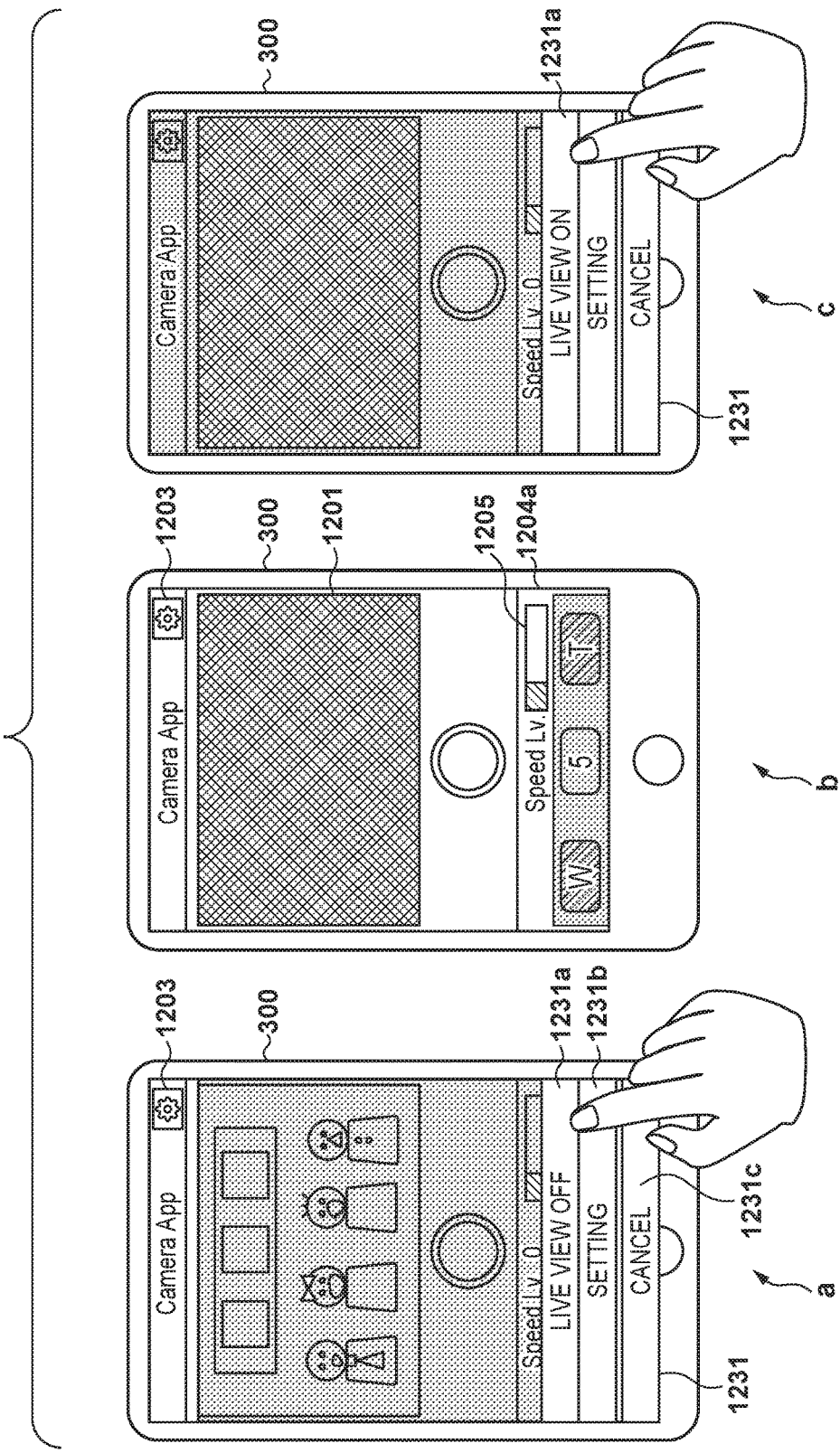

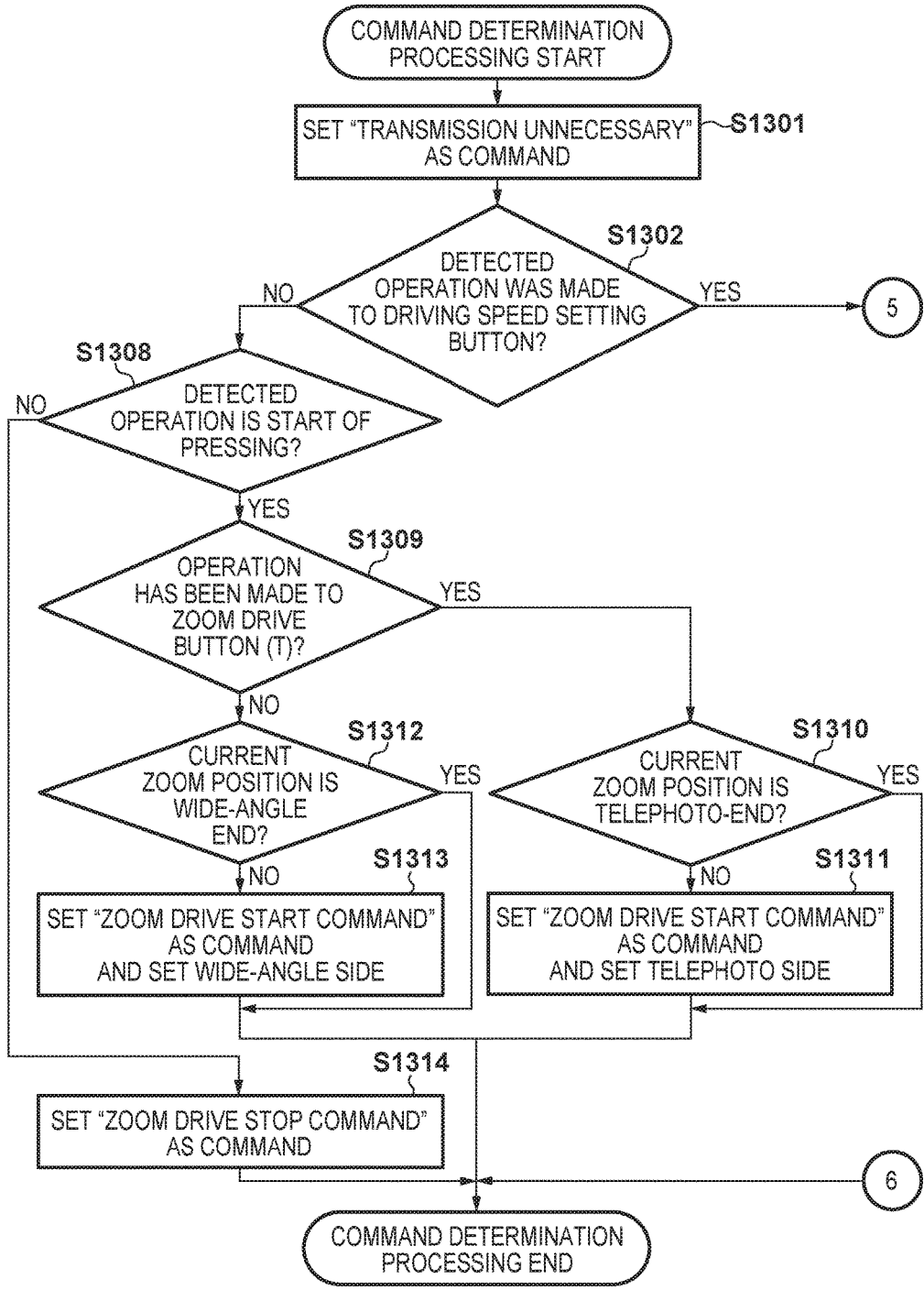

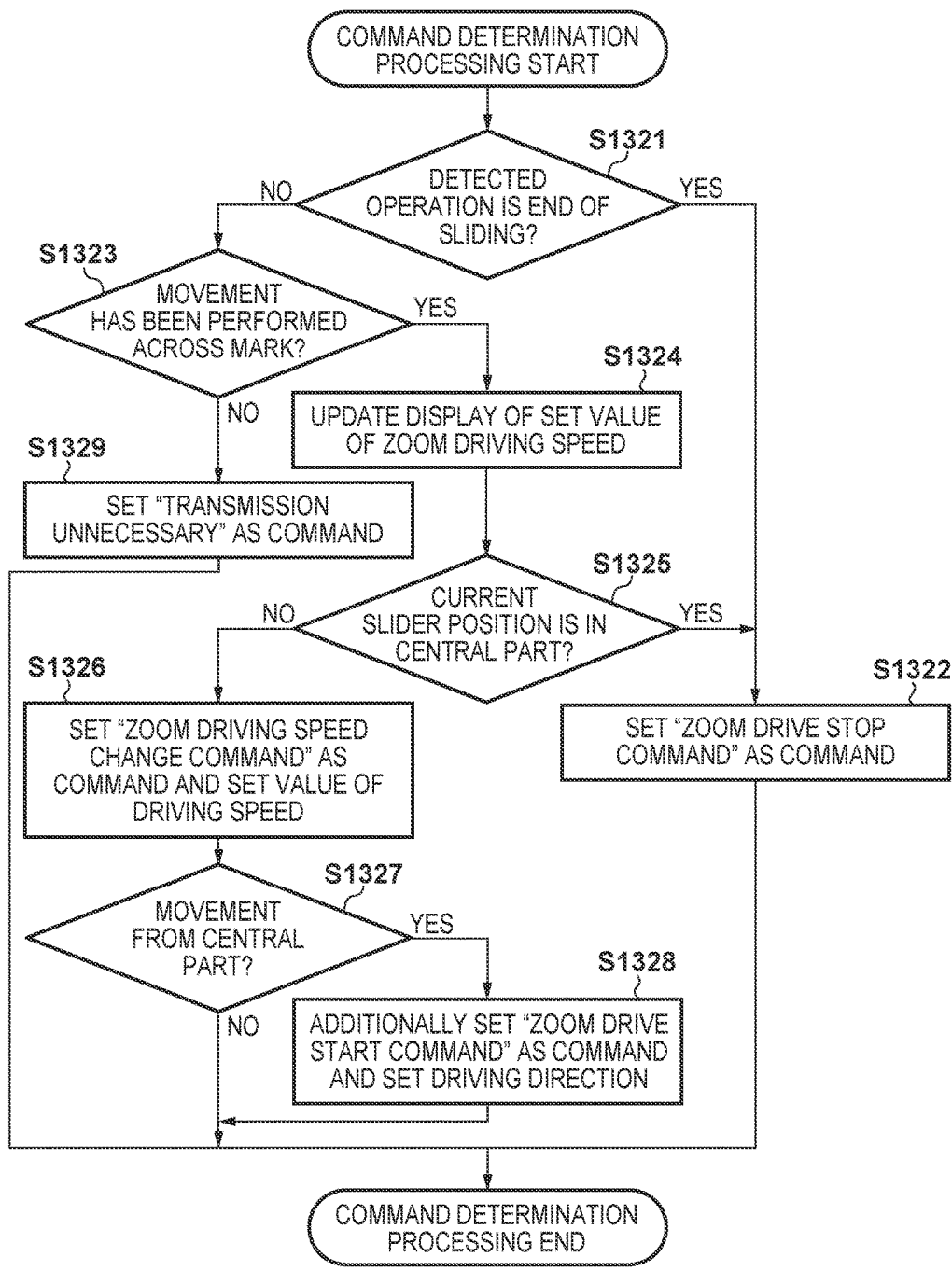

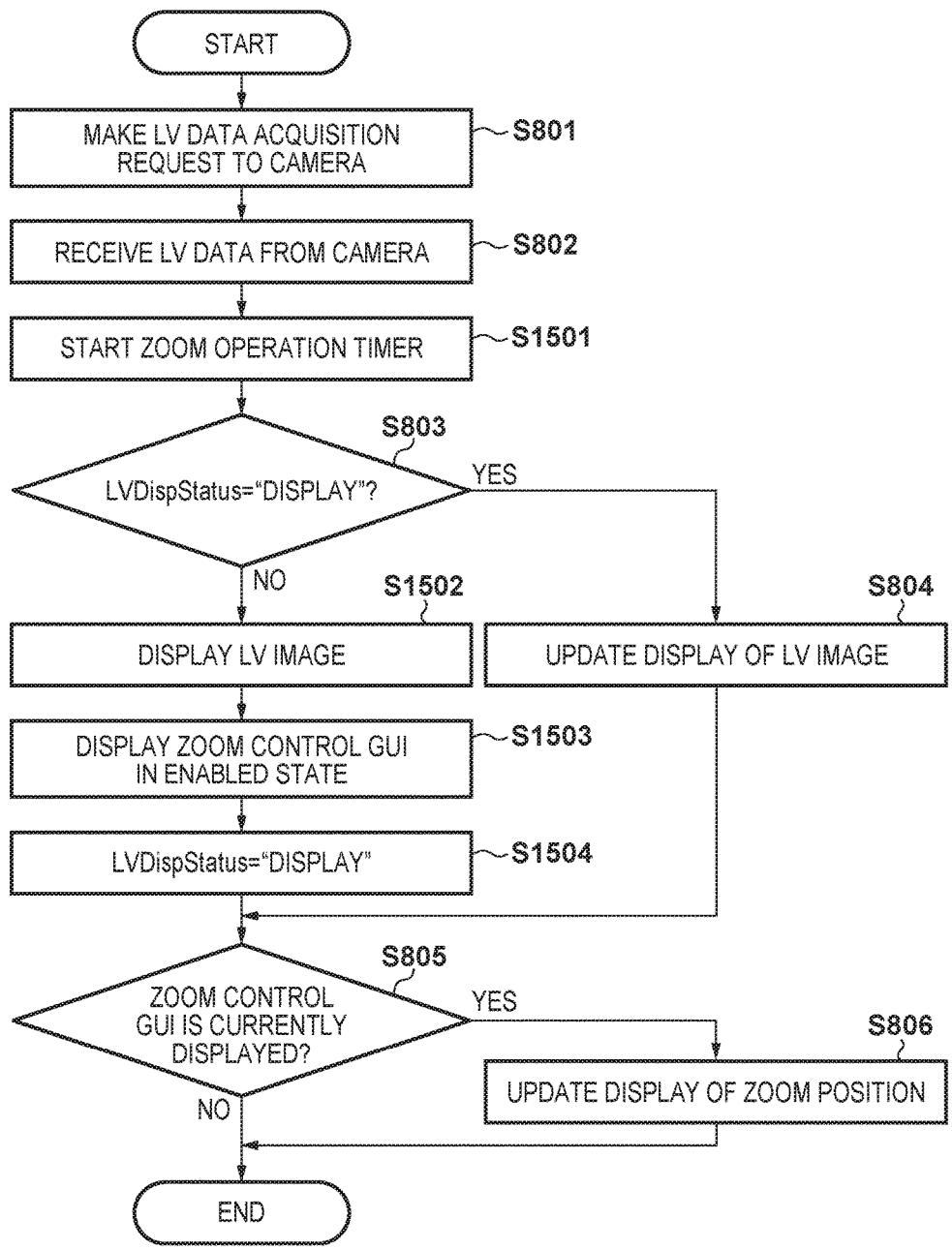

COMMUNICATION APPARATUS AND METHOD FOR CONTROLLING THE SAME

BACKGROUND OF THE INVENTION

Field of the Invention

The present invention relates to a communication apparatus and a method for controlling the communication apparatus.

Description of the Related Art

A system capable of causing an external device to display a live view image of a digital camera through wireless communication and performing remote shooting or remote capturing using the digital camera from the external device is known (Japanese Patent Laid-Open No. 2014-27338). A system capable of remotely performing a zoom operation on a digital camera from an external apparatus when the digital camera is provided with a non-interchangeable zoom lens is also known.

To display a live view image of the digital camera on the external device, moving image data needs to be continuously transmitted and received. Meanwhile, in general, it is not desirable that a battery is unnecessarily consumed in a battery-driven external device or digital camera. For this reason, it is conceivable to stop the display of the live view image (and transmission and reception of the live view image) to save battery life.

However, if a zoom operation is performed on the digital camera side or the external device side in a state where the display of the live view image (live view display) is stopped, a current angle of view or a current zoom position of the lens cannot be checked on the external device. In particular, even if a zoom operation is erroneously performed on the external device, it cannot be checked. As a result, while the live view display is stopped, a difference occurs between an actual zoom position and a zoom position assumed by a user of the communication apparatus, and for example, a situation where an expected image cannot be shot may occur.

SUMMARY OF THE INVENTION

According to the present invention, there are provided a communication apparatus capable of communicating with an image capture apparatus and a method for controlling the communication apparatus, which are possible to prevent the occurrence of a difference between an actual state of the image capture apparatus and a state assumed by a user of the communication apparatus, in a state where a moving image shot by the image capture apparatus is not displayed on the communication apparatus.

According to an aspect of the present invention, there is provided a communication apparatus capable of controlling an image capture apparatus, comprising: a reception unit configured to receive live image data, which is data of a live image captured by the image capture apparatus, wherein information regarding a predetermined parameter related to a capturing of the live image is added to the live image data received by the reception unit; a display unit configured to display a value that is based on the information regarding the predetermined parameter received by the reception unit as a current value of the predetermined parameter of the image capture apparatus; an instruction unit configured to accept an instruction to change the value of the predetermined parameter; a restriction unit configured to restrict reception of the live image data by the reception unit; and an informing unit configured to inform a user that the instruction to change the value of the predetermined parameter is restricted, if the reception of the live image data is restricted by the restriction unit.

According to another aspect of the present invention, there is provided a communication apparatus capable of controlling an image capture apparatus, comprising: a reception unit configured to receive live image data, which is data of a live image captured by the image capture apparatus, wherein information regarding a predetermined parameter related to a captured of the live image is added to the live image data received by the reception unit; a display unit configured to display a value that is based on the predetermined parameter received by the reception unit as a current value of the predetermined parameter of the image capture apparatus; an instruction unit configured to accept an instruction to change the value of the predetermined parameter; and a restriction unit configured to restrict reception of the live image data by the reception unit, wherein if the instruction to change the value of the predetermined parameter is accepted by the instruction unit, the reception unit starts to receive the live image data even if the reception of the live image data is restricted by the restriction unit.

According to a further aspect of the present invention, there is provided a method for controlling a communication apparatus capable of controlling an image capture apparatus, the method comprising: receiving live image data, which is data of a live image captured by the image capture apparatus, wherein information regarding a predetermined parameter related to a capturing of the live image is added to the received live image data; displaying a value that is based on the information regarding the predetermined parameter as a current value of the predetermined parameter of the image capture apparatus; and informing a user that an instruction to change the value of the predetermined parameter is restricted, if the reception of the live image data is restricted.

According to another aspect of the present invention, there is provided a method for controlling a communication apparatus capable of controlling an image capture apparatus, the method comprising: receiving live image data, which is data of a live image captured by the image capture apparatus, wherein information regarding a predetermined parameter related to a capturing of the live image is added to the received live image data; and displaying a value that is based on the information regarding the predetermined parameter as a current value of the predetermined parameter of the image capture apparatus, wherein, in the receiving, reception of the live image data generated by the image capture apparatus is started if an instruction to change the value of the predetermined parameter is accepted, even if the reception of the live image data is restricted.

According to a further aspect of the present invention, there is provided a non-transitory computer-readable storage medium for storing a computer-executable program, the program causing, when executed in a computer provided in a communication device, the computer to function as: a reception unit configured to receive live image data, which is data of a live image captured by an image capture apparatus, wherein information regarding a predetermined parameter related to a capturing of the live image is added to the live image data received by the reception unit; a display unit configured to display a value that is based on the information regarding the predetermined parameter received by the reception unit as a current value of the predetermined parameter of the image capture apparatus; an instruction unit configured to accept an instruction to change the value of the predetermined parameter; a restriction unit configured to restrict reception of the live image data by the reception unit;

and an informing unit configured to inform a user that the instruction to change the value of the predetermined parameter is restricted, if the reception of the live image data is restricted by the restriction unit.

According to another aspect of the present invention, there is provided a non-transitory computer-readable storage medium for storing a computer-executable program, the program causing, when executed in a computer provided in a communication device, the computer to function as: a reception unit configured to receive live image data, which is data of a live image captured by an image capture apparatus, wherein information regarding a predetermined parameter related to a capturing of the live image is added to the live image data received by the reception unit; a display unit configured to display a value that is based on the information regarding the predetermined parameter received by the reception unit as a current value of the predetermined parameter of the image capture apparatus; an instruction unit configured to accept an instruction to change the value of the predetermined parameter; and a restriction unit configured to restrict reception of the live image data by the reception unit, wherein if the instruction to change the value of the predetermined parameter is accepted by the instruction unit, the reception unit starts to receive the live image data generated by the image capture apparatus even if the reception of the live image data is restricted by the restriction unit.

Further features of the present invention will become apparent from the following description of exemplary embodiments with reference to the attached drawings.

BRIEF DESCRIPTION OF THE DRAWINGS

FIGS. 5A-1 and 5A-2 are flowcharts related to an operation of the digital camera according to an embodiment.

FIGS. 7A and 7B are flowcharts related to an operation of the mobile phone according to an embodiment.

FIG. 8 is a flowchart related to zoom position update processing in FIG. 7B.

FIGS. 9A and 9B are flowcharts related to processing at the time when an adapter is attached in FIG. 7A and processing at the time when a live view image is not displayed in FIG. 7B, respectively.

FIG. 11A is a diagram showing exemplary GUIs provided by an application that operates on a mobile phone according to an embodiment.

FIG. 11B is a diagram showing exemplary GUIs provided by the application that operates on the mobile phone according to an embodiment.

FIGS. 12A-1 and 12A-2 are flowcharts related to command determination processing in FIG. 7B.

FIG. 12B is a flowchart related to the command determination processing in FIG. 7B.

FIG. 14 is a flowchart related to operation of the mobile phone according to the second embodiment.

DESCRIPTION OF THE EMBODIMENTS

Exemplary embodiments of the present invention will now be described in detail in accordance with the accompanying drawings.

First Embodiment

Summary of Remote Shooting (Capturing) System

Figure 1:
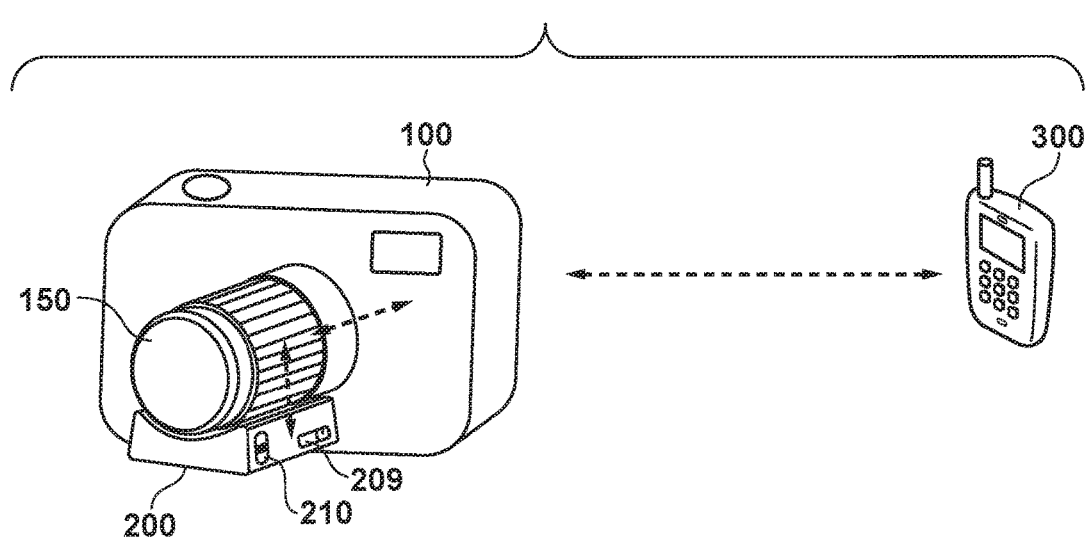
FIG. 1 is a schematic diagram showing an exemplary configuration of a shooting system according to an embodiment of the present invention.

FIG. 1 is a schematic diagram showing an exemplary configuration of a remote shooting system according to an embodiment. The remote shooting system has a digital camera (hereinafter, a camera) 100, which is an interchangeable-lens image capture apparatus having a function of communicating with an external apparatus, and a mobile phone 300, which serves as an example of an external device with which the camera 100 can communicate. Note that an interchangeable lens 150 (lens unit) having a manual zoom function is attached to the camera 100 (camera body), and a zoom adapter 200 is attached to the interchangeable lens 150. The zoom adapter 200 is an external device for mechanically driving a zoom mechanism in the interchangeable lens 150 from outside the interchangeable lens.

The camera 100 and the interchangeable lens 150 bidirectionally communicate with each other via a lens connection terminal and a camera connection terminal provided in their mounts. For example, the camera 100 transmits a command related to focus control to the interchangeable lens 150. The interchangeable lens 150 can transmit, to the camera 100, lens-specific information such as a maximum zoom position and a minimum zoom position, and information regarding a lens state such as a current focusing lens position and a zoom position.

The interchangeable lens 150 and the zoom adapter 200 bidirectionally communicate with each other via a zoom adapter connection terminal and a lens connection terminal. For example, the interchangeable lens 150 informs the zoom adapter 200 of zoom position information (current zoom position, maximum zoom position, and minimum zoom position). The zoom adapter 200 can determine whether or not a zoom operation can be performed, based on the zoom position information that the zoom adapter 200 is informed of. The zoom adapter 200 can also transmit information related to a state of the zoom adapter 200 to the interchangeable lens 150.

In this embodiment, although the camera 100 and the zoom adapter 200 are not physically connected, bidirectional communication therebetween is enabled by communicating via the interchangeable lens 150. For example, the camera 100 can grasp information from the zoom adapter 200 as a result of the interchangeable lens 150 forwarding information received from the zoom adapter 200 to the camera, or the interchangeable lens 150 informing the camera 100 of the information received from the zoom adapter 200.

Also, information can be transmitted from the camera 100 to the zoom adapter 200 as a result of the interchangeable lens 150 forwarding the information received from the camera 100 to the zoom adapter 200, or the interchangeable lens 150 informing the zoom adapter 200 of the information received from the camera 100. For example, it is possible to control operation of the zoom adapter 200 and cause the interchangeable lens 150 to change the zoom position by transmitting a zoom drive command that can be interpreted by the zoom adapter 200 from the camera 100 to the interchangeable lens 150.

The camera 100 and the mobile phone 300 bidirectionally communicate with each other through a wireless connection. Specifically, the camera 100 operates as a simple access point (simple AP) and forms a wireless LAN network. Upon operating as a simple AP, the camera 100 starts to regularly transmit a beacon signal. The mobile phone 300 detects the beacon signal, and joins the wireless LAN network formed by the camera 100. After the camera 100 has discovered the mobile phone 300, acquired capabilities thereof, and established communication therewith, bidirectional communication therebetween through the wireless LAN is enabled.

Note that the method for bidirectional communication between the camera 100 and the mobile phone 300 is not limited to the method in which the mobile phone 300 joins the network formed by the camera 100. For example, the camera 100 and the mobile phone 300 may bidirectionally communicate with each other on a wireless LAN network formed by an external access point by joining the wireless LAN. Note that the camera 100 and the mobile phone 300 do not need to be wirelessly connected, and may be connected by wire (e.g. by a USB cable).

After the communication has been established, the camera 100 can be remotely operated from the mobile phone 300 by performing given data exchange. For example, remote shooting using the camera 100 is enabled as a result of the mobile phone 300 acquiring a state of the camera 100 and transmitting an appropriate setting or shooting command to the camera 100.

Furthermore, in this embodiment, powered zoom control using the zoom adapter 200 can also be performed from the mobile phone 300. That is to say, the mobile phone 300 transmits, to the camera 100, a zoom control command addressed to the zoom adapter 200 as a command to change the angle of view of the interchangeable lens 150. Then, the camera 100 forwards this zoom control command to the interchangeable lens 150, and the interchangeable lens 150 further forwards this zoom control command to the zoom adapter 200. Thus, the zoom adapter 200 can be remotely operated from the mobile phone 300 as a result of the camera 100 and the interchangeable lens 150 relaying the control command for the zoom adapter 200 transmitted by the mobile phone 300. Accordingly, even if, for example, the interchangeable lens 150 is of a manual zoom type, zoom control of the interchangeable lens can be remotely performed from the mobile phone 300.

Next, individual devices that constitute the remote shooting system will be described.

Figure 2:
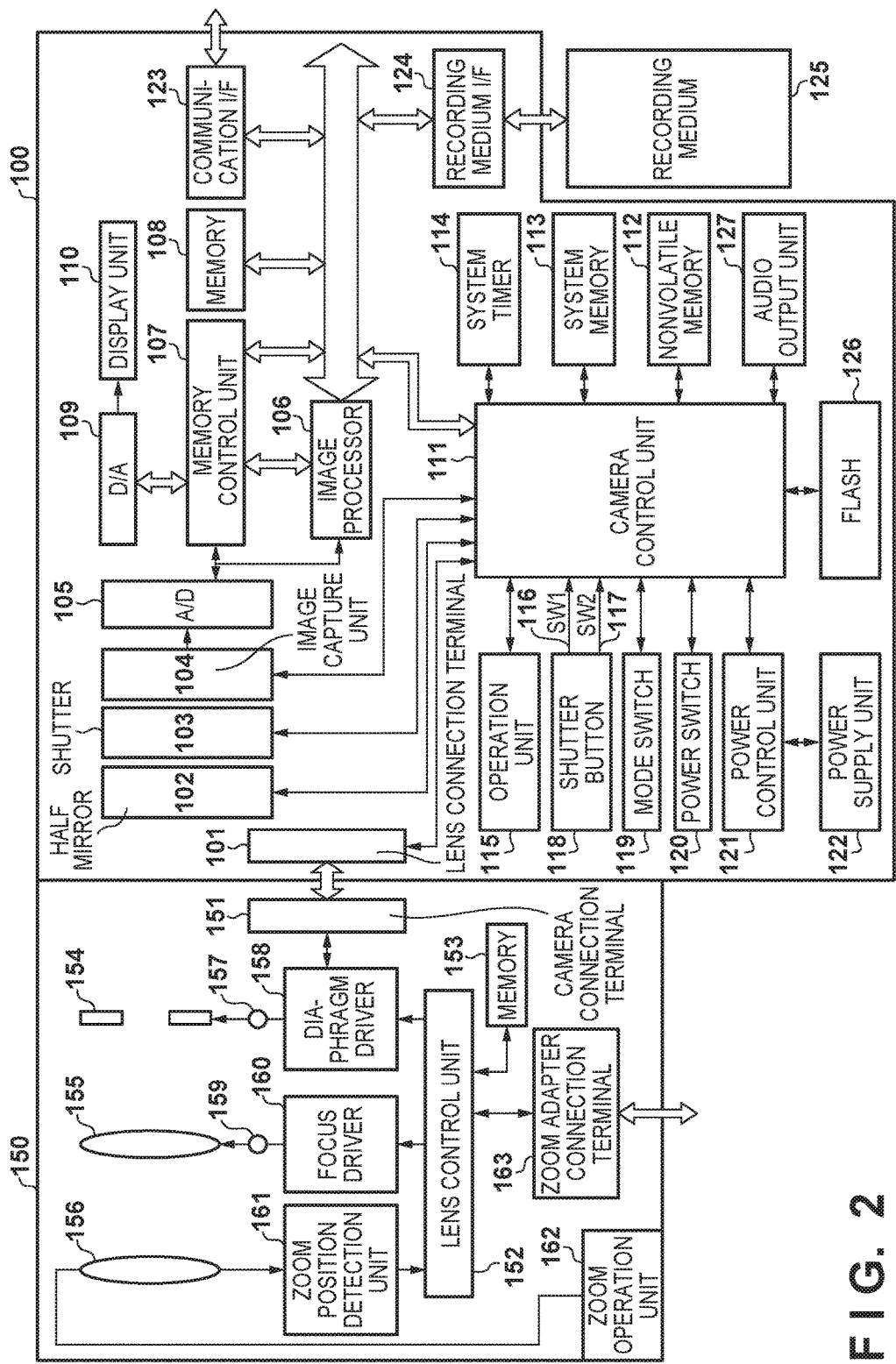
FIG. 2 is a block diagram showing an exemplary functional configuration of a digital camera and an interchangeable lens according to an embodiment.

FIG. 2 is a block diagram showing an exemplary functional configuration of the camera 100 and the interchangeable lens 150. As mentioned above, the camera 100 (camera body) is of an interchangeable-lens type, and is used with the interchangeable lens 150 attached thereto.

Configuration of Digital Camera

First, a configuration of the camera 100 will be described.

The camera 100 has a lens mount for attaching the interchangeable lens 150, and a lens connection terminal 101 is provided in the lens mount. The lens connection terminal 101 includes a contact group for coming into contact with a contact group on a camera connection terminal 151 provided on the interchangeable lens 150 to supply power to the interchangeable lens 150 and communicate therewith. The camera 100 communicates, to the interchangeable lens 150, an operation state thereof, a setting state thereof, a request command regarding various kinds of information (transmission request), a focus drive command, a zoom drive command addressed to the zoom adapter 200, and the like.

A half mirror 102 reflects incident light from the interchangeable lens 150 and guides the light to a focusing screen in an optical finder. A user can check a shooting area and a focus state by observing the focusing screen through an eyepiece. At the time of shooting, the half mirror 102 withdraws from an optical path such that the incident light can reach an image capture unit 104 through an aperture of a shutter 103. The image capture unit 104 is an image sensor that converts an optical image into an electric signal.

An A/D converter 105 converts an analog electric signal that is output by the image capture unit 104 into a digital electric signal (RAW data). The image processing unit 106 applies given image processing to the RAW data from the A/D converter 105 or image data from a memory control unit 107. Examples of image processing performed by the image processing unit 106 include white balance adjustment, demosaicing, color space conversion, resizing, coding or decoding, color conversion, subject detection, calculation of evaluation values used in automatic focus detection (AF) and automatic exposure control (AE), motion vector detection, and the like. Note that these are exemplary image processing, and configuration may be such that other kinds of image processing are executed, or such that some of the above examples of processing are not performed.

A later-described camera control unit 111 executes AF (autofocus) processing, AE (auto-exposure) processing, and EF (pre-lighting of a flash 126) processing of a TTL (through-the-lens) type, using the evaluation values calculated by the image processing unit 106. AF processing can be performed by means of a contrast detection method in which the focusing lens is moved to a position at which a largest AF evaluation value for a focus detection region in a captured image is obtained. Note that one or more focus detection regions can be set. In the case of performing face detection, a face region may be included in the focus detection region.

RAW data from the A/D converter 105 is written in the memory 108 via both the image processing unit 106 and the memory control unit 107, or via only the memory control unit 107. The memory 108 is used as an image buffer for storing image data such as RAW data, image data to be displayed, and image data to be recorded. The memory 108 has a sufficient storage capacity for storing a given number of still images as well as moving images and audio for given time.

The memory 108 also serves as a video memory. A D/A converter 109 converts the image data to be displayed stored in the memory 108 into an analog signal, and supplies this analog signal to a display unit 110. Thus, the image data to be displayed written in the memory 108 is displayed by the display unit 110 via the D/A converter 109. The display unit 110 can be caused to function as an electronic view finder by shooting moving images and causing the display unit 110 to sequentially display the shot moving images. Note that image data to be displayed for causing display devices including the display unit 110 that are provided in the camera 100 or connected to the camera 100 to function as an electronic view finder will be called live view image data. The image data to be displayed includes not only the live view image data but also image data for displaying various GUIs such as a menu screen, and image data for displaying the image data recorded in a recording medium 125 on the display unit 110, but is not limited thereto.

A nonvolatile memory 112 stores programs to be executed by the camera control unit 111, constants, unique information regarding the camera 100, various set values, GUI data, and the like. At least a part of the nonvolatile memory 112 may be rewritable.

The camera control unit 111 has one or more programmable processors (hereinafter called MPUs for convenience), for example. Each part of the camera 100 is controlled to achieve various functions of the camera 100 by loading, in a system memory 113, the programs stored in the nonvolatile memory 112 and causing the MPUs in the camera control unit 111 to execute the programs. These functions include functions for achieving the remote shooting system. The functions for achieving the remote shooting system include transmission and reception, interpretation, and execution of commands related to the remote shooting system, display of GUIs associated with the remote shooting system, execution of processing corresponding to a GUI operation, and the like. The system timer 114 generates a timing signal to be used in various kinds of control.

A mode switch 119 switches the operation mode of the camera control unit 111 to one of a still image recording mode, a moving image shooting mode, a reproduction mode, and the like. Modes included in the still image recording mode are an automatic shooting mode, an automatic scene identification mode, a manual mode, various scene modes serving as shooting settings for individual shooting scenes, a program AE mode, a custom mode, and the like. The mode switch 119 enables the operation mode to be directly switched to one of these modes included in the still image shooting mode. Alternatively, a configuration in which the operation mode is first switched to the still image shooting mode using the mode switch 119, and is thereafter switched to one of these modes included in the still image shooting mode using other operation members may be employed. Similarly, the moving image shooting mode may also include a plurality of modes.

A first shutter switch 116 turns on in the middle of an operation made to a shutter button 118, i.e. when the shutter button 118 is half-pressed, and generates a first shutter switch signal SW1 (shooting preparation instruction). Upon the first shutter switch signal SW1 being generated, shooting preparation operations, such as AF (autofocus) processing, AE (auto-exposure) processing, AWB (automatic white balance) processing, and EF (pre-flashing of the flash 126) processing, are started.

A second shutter switch 117 turns on upon an operation made to the shutter button 118 being completed, i.e. when the shutter button 118 is full-pressed, and generates a second shutter switch signal SW2 (shooting instruction). Upon the second shutter switch signal SW2 being generated, the camera control unit 111 starts a series of shooting and recording operations, starting from reading out a signal from the image capture unit 104 up to writing image data in the recording medium 125. Note that a shooting operation for causing the display unit 110 to function as an electronic view finder when in a shooting standby state will be called a display shooting operation, and a shooting operation performed due to generation of the second shutter switch signal SW2 will be called a recording shooting operation.

Functions assigned to respective buttons, switches and the like included in an operation unit 115 may be fixed, or different functions may be assigned depending on situation. For example, functions corresponding to contents displayed on the display unit 110 may be assigned to a direction key, a decision key, and a wheel.

A power control unit 121 detects an attachment state, the type, and the remaining capacity of a power supply unit 122, the number of times of charging and discharging thereof, a voltage thereof, and the like. The power control unit 121 supplies a necessary voltage to each part, including the recording medium 125, for a necessary time period based on the detection result and an instruction from the camera control unit 111. Upon a power switch 120 being turned on, the camera control unit 111 instructs the power control unit 121 to supply power to each part.

The power supply unit 122 is a primary battery, a secondary battery, an AC adapter, or the like. A recording medium I/F 124 is an interface for communication with the recording medium 125. The recording medium 125, which is detachable, is constituted by a semiconductor memory, a magnetic disk, or the like, and is used for recording image data obtained by shooting.

A communication I/F 123 is an interface for communication with an external apparatus, and supports wired and wireless communication. Here, examples of wired communication include communication via a USB cable, a LAN cable, an HDMI (registered trade mark) cable, or the like, and examples of wireless communication include communication using a wireless LAN, Bluetooth (registered trademark), or the like. The communication I/F 123 may be a video output terminal, and can transmit an image shot by the image capture unit 104 (including a live view image) and an image recorded in the recording medium 125 to an external apparatus. Note that, in this embodiment, the camera 100 (camera control unit 111) communicates with the mobile phone 300 conforming to a wireless LAN standard via the communication I/F 123.

An audio output unit 127 may be a speaker, for example, and outputs an audio signal that is output by the camera control unit 111, as audible sound.

Configuration of Interchangeable Lens

Next, a configuration of the interchangeable lens 150 will be described. The mount provided on the interchangeable lens 150 is provided with the camera connection terminal 151. The camera connection terminal 151 includes a contact group for coming into contact with a contact group in the lens connection terminal 101 provided in the camera 100 to receive power supply from the camera 100 and communicate with the camera 100.

A lens control unit 152 has one or more programmable processors (hereinafter called MPUs for convenience), for example. Various functions of the interchangeable lens 150 including communication with the camera 100 and the zoom adapter 200 are achieved by loading programs stored in a nonvolatile memory 153 and causing the MPUs in the lens control unit 152 to execute these programs. These functions include functions for achieving the remote shooting system, or more specifically, a function of forwarding or relaying commands related to the remote shooting system, and the like. The memory 153 stores programs to be executed by the lens control unit 152, as well as characteristic information and optical information that are unique to the interchangeable lens 150, and the like.

The characteristic information is unique information that does not vary in principle, and includes information such as the name of the interchangeable lens 150 (ID information for specifying the model thereof), the maximum and minimum focal lengths, the highest communication speed, and the minimum F number. The optical information is optically unique information that varies in accordance with the angle of view, focus, the F-number, and the like, and includes information such as a current focal length, the F-number, an amount of correction (design value), and a manufacturing error value, for example.

The interchangeable lens 150 includes a diaphragm 154 whose aperture size is variable, a focusing lens 155 whose position in the optical axis direction is variable, and a variable magnification lens 156. The interchangeable lens 150 is an imaging optical system of the camera 100, and forms an optical image of a subject on an image forming plane in the image capture unit 104.

The interchangeable lens 150 also has a diaphragm motor 157 for driving the diaphragm 154, and a focus motor 159 for driving the focusing lens 155. The diaphragm motor 157 and the focus motor 159 can detect the position of the diaphragm and the focusing lens by using stepping motors as the diaphragm motor 157 and the focus motor 159 and counting the number of pulses for driving these motors after a reset operation. In the case of using other actuators as the diaphragm motor 157 and the focus motor 159, a configuration for detecting the positions of the diaphragm and the focusing lens need only be provided separately.

Operation of the diaphragm motor 157 is controlled by the lens control unit 152 through a diaphragm driver 158. Similarly, operation of the focus motor 159 is controlled by the lens control unit 152 through a focus driver 160.

A zoom operation unit 162 is a movable member that is operated by the user to vary the angle of view of the interchangeable lens 150, and is, typically, a zoom ring. The interchangeable lens 150 is provided with a movement mechanism for moving the variable magnification lens 156 along the optical axis in conjunction with a movement of the zoom operation unit 162. In this embodiment, operation of the zoom operation unit 162 and the movement mechanism are configured to be mechanically associated with each other, and the interchangeable lens 150 is a manual zoom lens.

A zoom position detection unit 161 detects the position of the variable magnification lens 156. The zoom position detection unit 161 is constituted by a potentiometer, for example, and outputs an electric signal that corresponds to the position of the variable magnification lens 156. The lens control unit 152 performs A/D conversion on the electric signal that is output by the zoom position detection unit 161, and saves the converted signal as digital data in the memory 153. If data indicating correspondence between the position of the variable magnification lens 156 and the angle of view is stored in advance in the memory 153, for example, the lens control unit 152 can obtain the current angle of view based on the output signal from the zoom position detection unit 161.

Also, by storing, in the memory 153 for example, data on correspondence between the focusing lens position and the lens-to-subject distance, and data on correspondence between the diaphragm position and the F number, the lens control unit 152 can acquire the lens-to-subject distance from the focusing lens position, and acquire the F number from the diaphragm position.

Furthermore, the interchangeable lens 150 has a zoom adapter connection terminal 163 for connecting the zoom adapter 200, which can be attached to and detached from the interchangeable lens 150. The interchangeable lens 150 bidirectionally communicates with the connected zoom adapter 200 through the zoom adapter connection terminal 163. The lens control unit 152 detects whether or not the zoom adapter 200 is connected, and saves information indicating the detection result. If the zoom adapter 200 is connected or removed, the lens control unit 152 updates the information regarding the connection of the zoom adapter 200.

Configuration of Zoom Adapter

Figure 3:
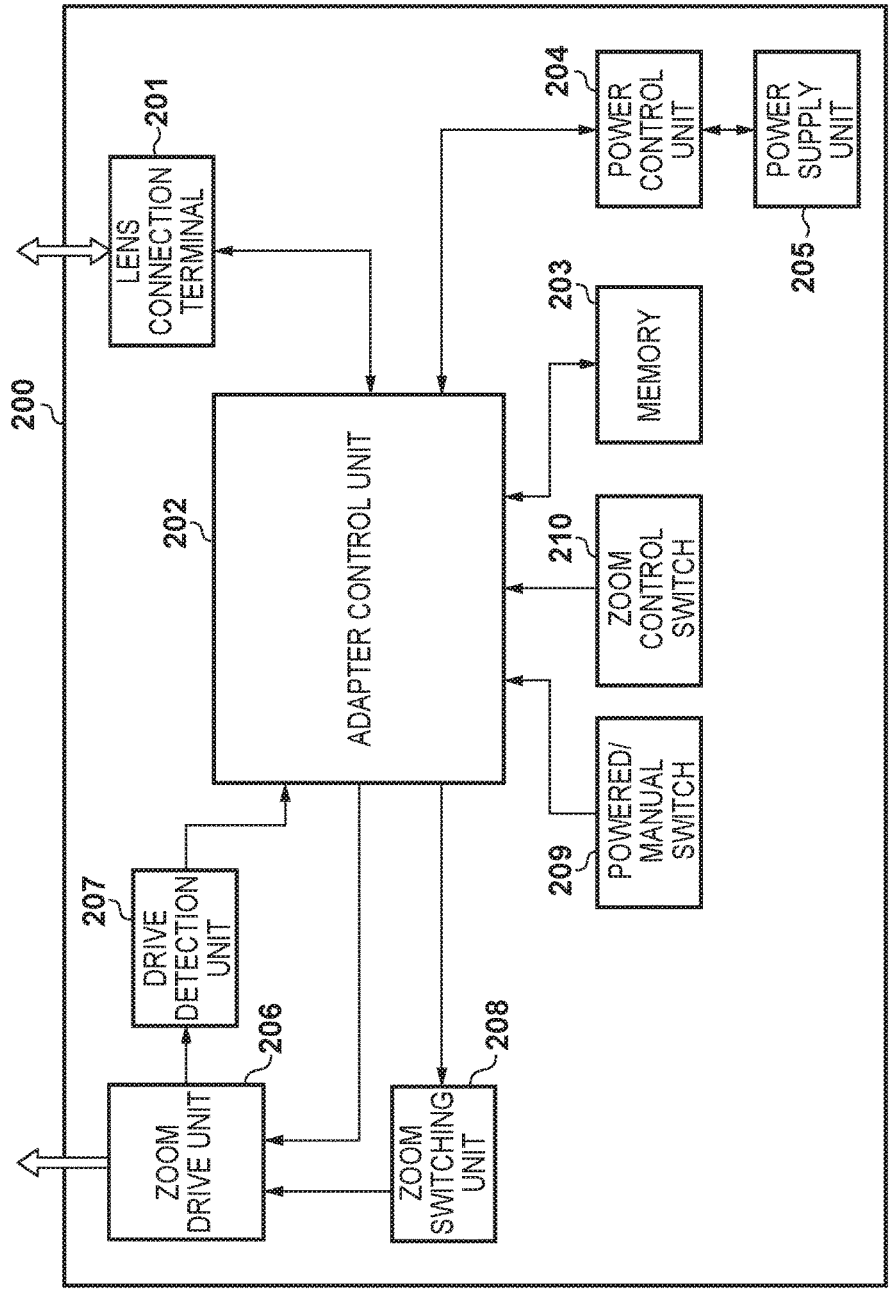
FIG. 3 is a block diagram showing an exemplary functional configuration of a zoom adapter according to an embodiment.

Next, the zoom adapter 200 to be connected to the interchangeable lens 150, which is a zoom lens, will be described with reference to FIG. 3. The zoom adapter 200 is a driver device that mechanically drives, from outside the interchangeable lens 150, an operation member (e.g. a zoom ring) of a zoom mechanism in the interchangeable lens 150 to enable powered zoom of the interchangeable lens 150. Hereinafter, driving of the zoom mechanism in the interchangeable lens 150 by using the zoom adapter 200 will be called powered zoom, and manual driving of the zoom mechanism by the user will be called manual zoom.

The zoom adapter 200 has a lens connection terminal 201 to be connected to the zoom adapter connection terminal 163 in the interchangeable lens 150, and can bidirectionally communicate with the interchangeable lens 150.

An adapter control unit 202 has one or more programmable processors (hereinafter called MPUs for convenience), for example. Various functions of the zoom adapter 200 including communication with the interchangeable lens 150 or communication with the camera 100 through the interchangeable lens 150 are achieved by loading programs stored in a nonvolatile memory 203 and causing the MPUs in the adapter control unit 202 to execute these programs. These functions include functions for achieving the remote shooting system, such as transmission and reception, as well as interpretation and execution of commands related to the remote shooting system.

The memory 203 stores the programs to be executed by the adapter control unit 202, status information and control information regarding the zoom adapter 200, and the like. The status information is various kinds of information regarding a current state of the zoom adapter 200, including information regarding the remaining capacity of a battery thereof, a setting state of a later-described powered/manual switch 209, a set value of the zoom speed, and the like. The control information is information regarding capabilities of the zoom adapter 200, items and contents that can be set from outside the zoom adapter 200, such as a list indicating settable driving speeds at the time of driving for remote zoom, and the like. A current set value of the zoom speed may be included in the control information. The adapter control unit 202 reads out the status information and the control information from the memory 203 and transmits the read information according to a request from outside the zoom adapter 200.

A power control unit 204 detects an attachment state, the type, and the remaining capacity of a power supply unit 205, the number of times of charging and discharging thereof, a voltage thereof, and the like. The power control unit 204 supplies a necessary voltage to each part for a necessary time period based on the detection result and an instruction from the adapter control unit 202. The power supply unit 205 is constituted by a primary battery such as an alkali battery or a lithium battery, a secondary battery such as a NiCd battery, a NiMH battery, or a Li battery, or the like.

A zoom drive unit 206 is an actuator that mechanically drives the zoom operation unit 162 (and the zoom mechanism associated therewith) in the interchangeable lens 150 in accordance with a command from the adapter control unit 202. For example, the zoom drive unit 206 has a driver member that is in contact with the zoom ring constituting the zoom operation unit 162, and a motor for moving (e.g. rotating) the driver member. By rotating the driver member, the zoom drive unit 206 can rotate the zoom ring with a friction force generated between the driver member and the zoom ring, and drive the zoom mechanism within the interchangeable lens 150.

Although there is no particular restriction on the material and the shape of the driver member provided in the zoom drive unit 206, a roller, a belt, a gear, or the like having a surface shape that meshes with knurls formed on a surface of the zoom ring may be employed, for example. Alternatively, a member that generates a sufficient friction force for driving the zoom ring may be a roller, a belt, or the like that is provided on at least a surface that comes into contact with the zoom ring. Thus, the zoom adapter 200 achieves a similar operation to a manual operation of rotating the zoom ring performed by the user, through the zoom drive unit 206.

A drive detection unit 207 detects the driving direction and the driving amount of the zoom drive unit 206 and informs the adapter control unit 202 thereof.

A zoom switching unit 208 switches between enabling and disabling the driving of the zoom operation unit 162 performed by the zoom drive unit 206, in accordance with an instruction from the adapter control unit 202. For example, the zoom switching unit 208 can physically disable the driving of the zoom operation unit 162 by separating the driver member in the zoom drive unit 206 from the zoom operation unit 162, for example. Alternatively, the zoom switching unit 208 may electrically disable the driving of the zoom operation unit 162 by invalidating a drive instruction from the zoom drive unit 206.

By disabling the driving of the zoom operation unit 162 performed by the zoom drive unit 206, a conventional manual operation to the zoom operation unit 162 is enabled even in a state where the zoom adapter 200 is connected.

The adapter control unit 202 can set, for the zoom switching unit 208, whether to enable or disable the driving of the zoom operation unit 162 performed by the zoom drive unit 206 in accordance with a setting of the powered/manual switch 209, for example.

A zoom control switch 210 is a switch for performing a powered zoom operation to the interchangeable lens 150 by using the zoom adapter 200. The zoom control switch 210 may be a slide lever, for example, and the adapter control unit 202 is informed of the moving direction and the moving amount of the lever. The adapter control unit 202 controls the driving direction and the driving speed of the zoom drive unit 206 in accordance with the moving direction and the moving amount of the zoom control switch 210. Note that if manual zoom has been set by the powered/manual switch 209, the adapter control unit 202 ignores the operation of the zoom control switch 210.

Furthermore, the adapter control unit 202 can also accept a zoom control command from outside the zoom adapter 200 via the lens connection terminal 201. That is to say, upon receiving the zoom control command via the lens connection terminal 201, the adapter control unit 202 controls the zoom drive unit 206 based on the zoom control command, and executes a powered zoom operation for the interchangeable lens 150.

Configuration of Mobile Phone

Figure 4:
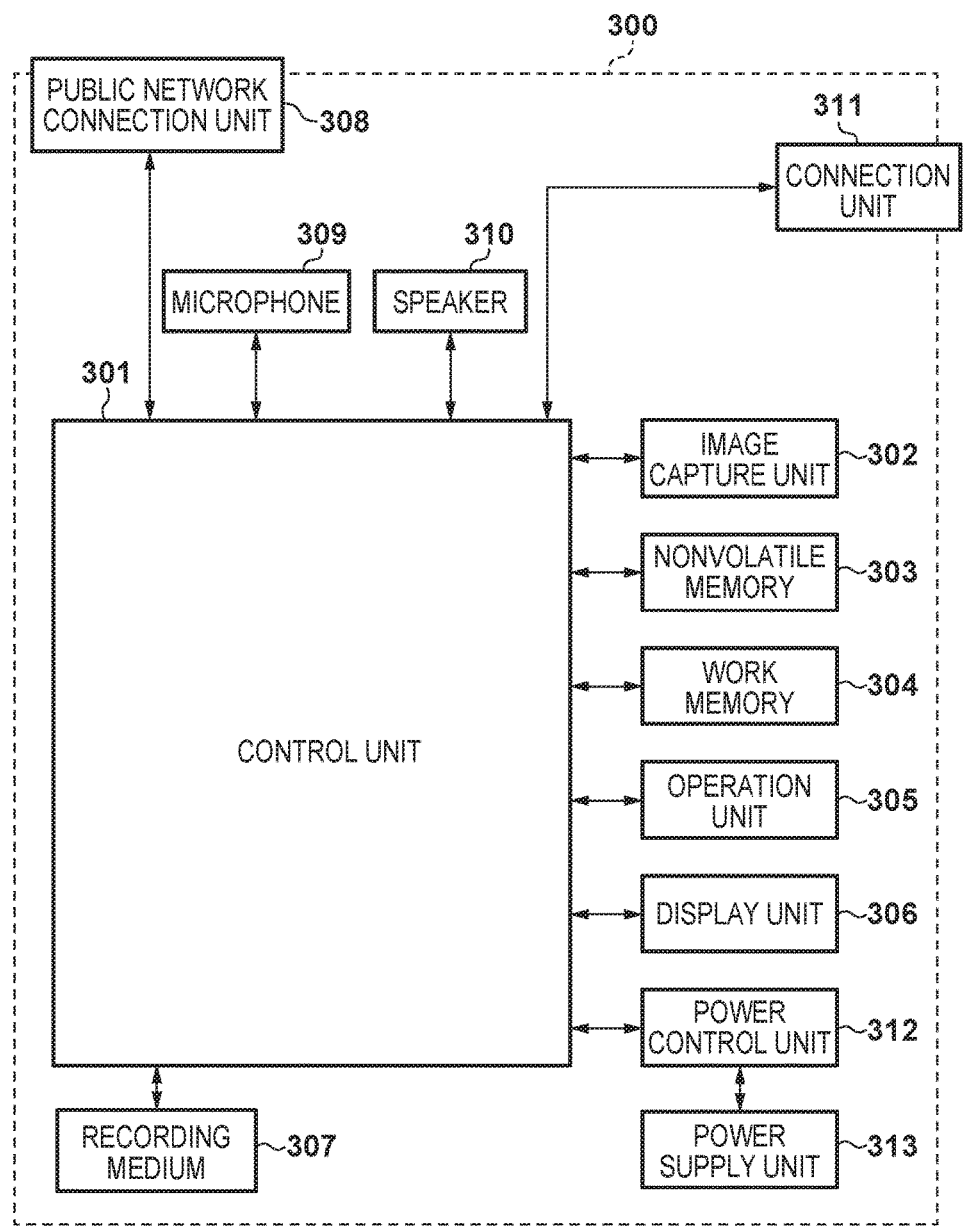
FIG. 4 is a block diagram showing an exemplary functional configuration of a mobile phone according to an embodiment.

Next, an exemplary configuration of the mobile phone 300 in FIG. 1 will be described with reference to FIG. 4. The mobile phone 300 is an example of an external apparatus with which the camera 100 can communicate, and any other electronic devices capable of communicating with the camera 100 may be used in place of the mobile phone 300. For example, such electronic devices include a digital camera, a media player, a tablet device, a personal computer, a smartphone, a game machine, and the like that have a wireless communication function, but are not limited thereto.

A control unit 301 has one or more programmable processors (hereinafter called MPUs for convenience), for example. Various functions of the mobile phone 300 such as communication with the camera 100 are achieved by loading programs stored in a nonvolatile memory 303 and causing the MPUs in the control unit 301 to execute these programs. The nonvolatile memory 303 stores programs (an OS and applications) to be executed by the control unit 301, various set values, GUI data, and the like. Note that, rather than the control unit 301 controlling the overall device, a plurality of pieces of hardware may be assigned to the control of the overall mobile phone 300.

Note that a later-described operation of the mobile phone 300 related to the remote control system is achieved as a result of the control unit 301 executing a program stored as a camera communication application in the nonvolatile memory 303. The camera communication application achieves transmission and reception, as well as interpretation and execution of commands related to the remote shooting system, display of GUIs related to the remote shooting system, execution of processing corresponding to a GUI operation, and the like. Note that the camera communication application has a program that uses a function provided by an OS operating on the mobile phone 300. Note that the OS operating on the mobile phone 300 may include a program for achieving the operation of the mobile phone 300 in this embodiment.

An image capture unit 302 is a camera module, includes an imaging optical system and an image sensor, and outputs, to the control unit 301, image data obtained by shooting based on an instruct from the control unit 301. The control unit 301 applies, to the image data, similar processing to that performed in common digital cameras, and temporarily saves the image data in a work memory 304. Thereafter, the image data is stored in an image file corresponding to a predetermined recording format, and is recorded in a recording medium 307.

The work memory 304 is used as a buffer memory for temporarily saving the image data generated by the image capture unit 302, a display memory (video memory) for the display unit 306, a work area for the control unit 301, and the like.

An operation unit 305 is an input device group for the user to input an instruction to the mobile phone 300. For example, the operation unit 305 includes a power switch, a shutter button in the image capture unit 302, a touch panel formed on the display unit 306, and the like.

A display unit 306 is used to display the image data obtained by the image capture unit 302, a user interface for an interactive operation, a text message, information regarding a call, and the like. Note that the display unit 306 does not necessarily need to be included in the mobile phone 300. The mobile phone 300 need only be able to be connected to the display unit 306 and have a function of controlling display of the display unit 306.

The recording medium 307 is a nonvolatile storage medium such as a memory card, and can record not only the image data obtained by the image capture unit 302, but also data received by the mobile phone 300, an address book, and the like. The recording medium 307 may be configured such that it can be attached to and detached from the mobile phone 300, or may be embedded in the mobile phone 300. That is to say, the mobile phone 300 need only be able to access at least the recording medium 307.

A public network connection unit 308 is an interface used for connection to a public wireless telephone network. The mobile phone 300 can be connected to a public wireless telephone network via the public network connection unit 308 to make a voice call and perform data communication with other telephones. During a call, the control unit 301 inputs and outputs audio signals via a microphone 309 and a speaker 310. In this embodiment, the public network connection unit 308 includes an interface for performing 3G communication. Note that the communication standard used here is not limited to 3G, and other communication standards such as LTE, WiMAX, ADSL, FTTH, and so-called 4G may be used.

A connection unit 311 is an interface for connection to an external apparatus. The mobile phone 300 according to this embodiment can communicate with an external apparatus via the connection unit 311. Note that, in this embodiment, the connection unit 311 includes an interface for communicating with an external apparatus conforming to a wireless LAN (IEEE 802.11x) protocol, but other wireless communication protocols such as Bluetooth may also be used. The control unit 301 achieves wireless communication with an external apparatus by controlling the connection unit 311.

Note that the mobile phone 300 according to this embodiment can operate as at least a slave device in a wireless LAN infrastructure mode, and can join a network formed by an AP located therearound. The connection unit 311 and the public network connection unit 308 do not necessarily need to be constituted by independent pieces of hardware, and may be achieved by common hardware.

A power control unit 312 detects an attachment state, the type, and the remaining capacity of a power supply unit 313, the number of times of charging and discharging thereof, a voltage thereof, and the like. The power control unit 312 supplies a necessary voltage to each part for a necessary time period based on the detection result and an instruction from the control unit 301. The power supply unit 313 is constituted by a primary battery such as an alkali battery or a lithium battery, a secondary battery such as a NiCd battery, a NiMH battery, or a Li battery, an AC adapter, or the like.

A description will be given below of operations of each device for achieving remote shooting using the camera 100 from the mobile phone 300 in the remote shooting system.

Operation of Digital Camera

Figures 1, 5A:
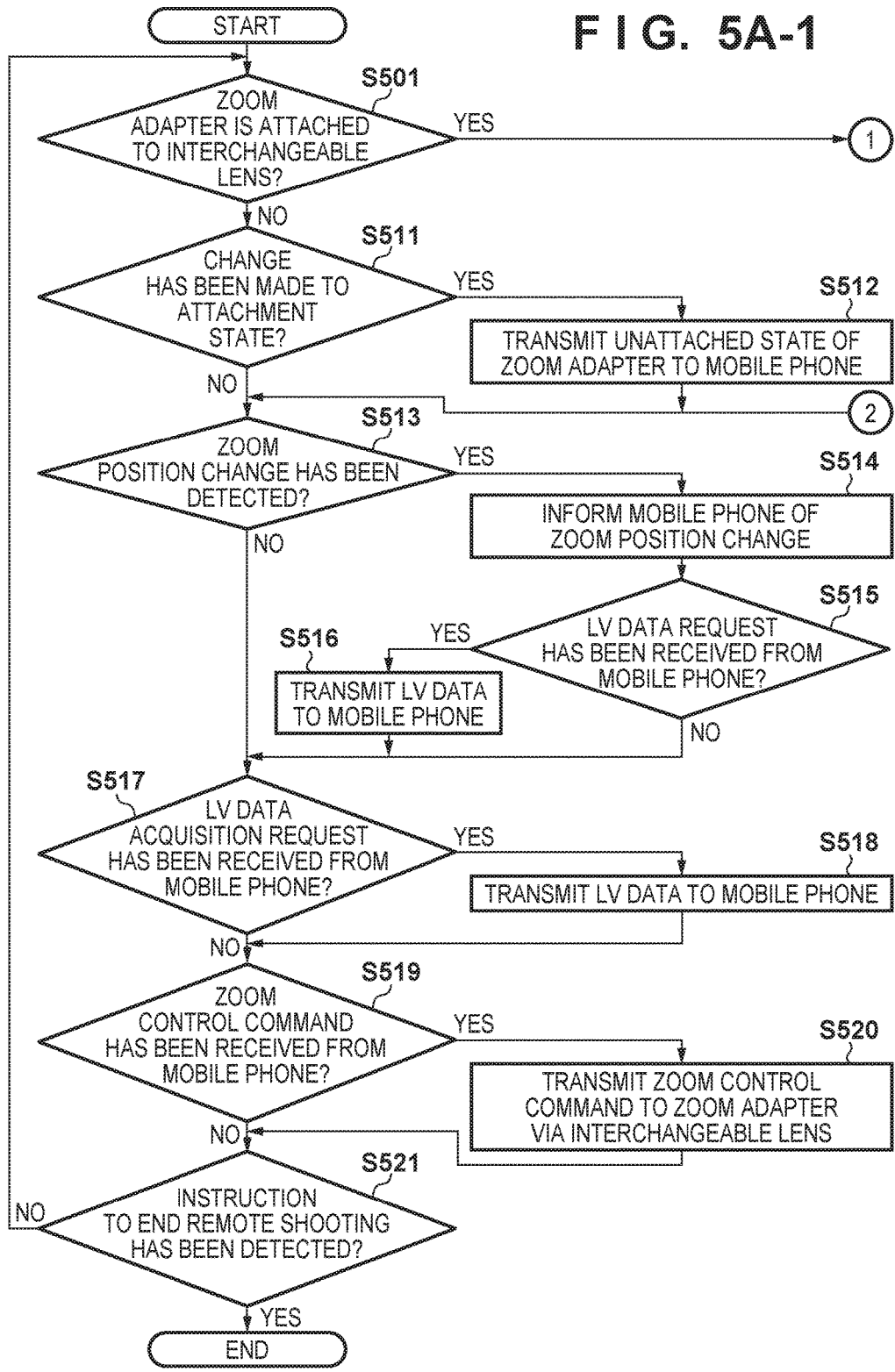
Figures 2, 5A:
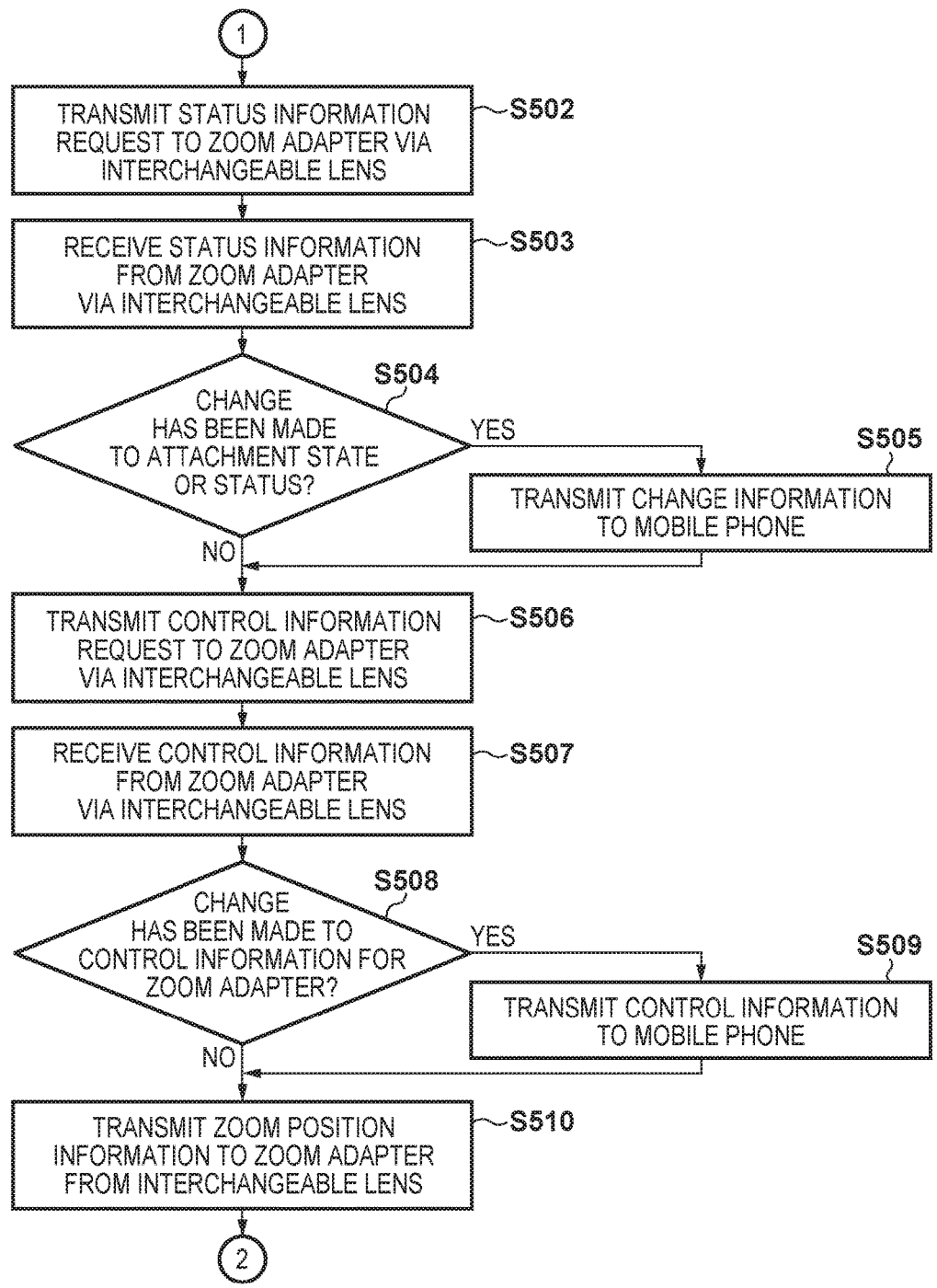

First, operation of the camera 100 will be described using flowcharts in FIGS. 5A-1 and 5A-2. The operation shown in FIGS. 5A-1 and 5A-2 is started when communication between the mobile phone 300 and the camera 100 has been established, and an instruction to start a remote shooting operation has been given from the camera communication application on the mobile phone 300 to the camera 100, for example. Note that, during a remote shooting operation, the camera 100 regularly (e.g. at a given frame rate) generates a live view image and transmits, to the mobile phone 300, this live view image together with associated information as live view data. The camera 100 may generate the live view image to be transmitted to the mobile phone 300 at a resolution that is appropriate for the display unit 306 on the mobile phone 300, or may transmit a live view image to be displayed on the display unit 110.

The associated information transmitted together with the live view image includes at least current zoom position information that indicates a current zoom position of the interchangeable lens 150 (at the time of shooting the live view image). However, the associated information may include any information that is desirable to be associated with the live view image, such as information regarding an in-focus distance, the position of a focus detection region, and the position and size of a focus detection region and a subject region (e.g. a face region). The associated information may also include any other information such as current shooting conditions (shutter speed, F-number, ISO speed etc.) in the camera 100. The maximum zoom position and the minimum zoom position of the interchangeable lens 150 may also be included in the associated information, but may alternatively be configured to be transmitted only when communication between the camera 100 and the mobile phone 300 is enabled, or when the interchangeable lens 150 is replaced. In other embodiments, configuration may be taken so that the current zoom position information is not be included in the associated information, and may be transmitted at a timing different from the timing of transmitting the live view image. The mobile phone 300 displays the live view image received from the camera 100 in a live view image region of the camera communication application, thereby causing the live view image region to function as an external EVF of the camera 100.

Note that, in the following description, processing performed by the camera 100 is achieved as a result of, in practice, the MPUs provided in the camera control unit 111 executing a program stored in the nonvolatile memory 112 and controlling other constituent elements as necessary. Similarly, processing performed by the interchangeable lens 150 is achieved as a result of the MPUs provided in the lens control unit 152 executing programs stored in the memory 153 and controlling other constituent elements as necessary. Processing performed by the zoom adapter 200 is achieved as a result of the MPUs provided in the adapter control unit 202 executing programs stored in the memory 203 and controlling other constituent elements as necessary. Furthermore, processing performed by the mobile phone 300 is achieved as a result of the MPUs provided in the control unit 301 executing programs (in particular, the camera communication application) stored in the nonvolatile memory 303 and controlling other constituent elements as necessary.

Although the camera 100 and the zoom adapter 200 directly transmit and receive data to/from each other in the following description, in practice, bidirectional communication between the camera 100 and the zoom adapter 200 is achieved as a result of the interchangeable lens 150 relaying or forwarding data. Note that the lens control unit 152 can identify whether the data received from the camera 100 and the zoom adapter 200 is to be forwarded, by referencing header information, for example.

In step S501, the camera 100 acquires information from the interchangeable lens 150 and determines whether or not the zoom adapter 200 is attached to the interchangeable lens 150. If it is determined that the zoom adapter 200 is attached, the camera 100 advances the processing to step S502, and if it is not determined that the zoom adapter 200 is attached, the camera 100 advances the processing to step S511.

In step S502, the camera 100 transmits, to the interchangeable lens 150, a status information request addressed to the zoom adapter 200. As mentioned above, if the interchangeable lens 150 identifies that a destination of the request is the zoom adapter 200, the interchangeable lens 150 forwards the request to the zoom adapter 200.

In step S503, the camera 100 receives, via the interchangeable lens 150, the status information transmitted from the zoom adapter 200 in response to the request in step S502. This status information is transmitted by the zoom adapter 200 in later-described step S602 in FIG. 6A, and is forwarded by the interchangeable lens 150.

In step S504, the camera 100 determines whether or not a change has been made to the attachment state or the status information regarding the zoom adapter 200, advances the processing to step S505 if it is determined that a change has been made, and advances the processing to step S506 if it is not determine that a change has been made.

In step S505, the camera 100 transmits the attachment state and the status information regarding the zoom adapter 200 to the mobile phone 300. Note that only the attachment state or the status information that has been changed may be transmitted. The attachment state and the status information may be transmitted at different timings.

In step S506, the camera 100 transmits a control information request to the zoom adapter 200, via the interchangeable lens 150.

In step S507, the camera 100 receives the control information transmitted from the zoom adapter 200 in response to the request in step S506, via the interchangeable lens 150. This status information is transmitted by the zoom adapter 200 in step S604 in FIG. 6A, and is forwarded by the interchangeable lens 150.

In step S508, the camera 100 determines whether or not a change has been made to the control information regarding the zoom adapter 200, advances the processing to step S509 if it is determined that a change has been made, and advances the processing to step S510 if it is not determined that a change has been made. Note that, at first determination, the camera 100 determines that a change has been made (YES).

In step S509, the camera 100 transmits the control information to the mobile phone 300.

In step S510, the camera 100 requests the interchangeable lens 150 to transmit the zoom position information to the zoom adapter 200. The zoom position information includes the current zoom position, the maximum zoom position, and the minimum zoom position of the interchangeable lens 150. These positions may be represented by angles of view or variable magnification lens positions. Note that configuration may be taken so that the maximum zoom position and the minimum zoom position are not transmitted every time in this step, and are transmitted only once when communication between the interchangeable lens 150 and the zoom adapter 200 is enabled.

On the other hand, in step S511, the camera 100 determines whether or not a change has been made to the attachment state of the zoom adapter 200, advances the processing to step S512 if it is determined that a change has been made, and advances the processing to step S513 if it is not determined that a change has been made. In step S511, it is determined that a change has been made (YES) only at first determination, or at the time of determination performed immediately after the zoom adapter 200 has been removed.

In step S512, the camera 100 informs the mobile phone 300 that the zoom adapter 200 is not attached.

In step S513, the camera 100 determines whether or not a change has been made in the zoom position of the attached interchangeable lens 150, advances the processing to step S514 if it is determined that a change has been made, and advances the processing to step S517 if it is not determined that a change has been made.

In step S514, the camera 100 informs the mobile phone 300 that the zoom position of the interchangeable lens 150 has been changed.

In step S515, the camera 100 determines whether or not a live view data transmission request has been received from the mobile phone 300, advances the processing to step S516 if it is determined that the request has been received, and advances the processing to step S517 if it is not determined that the request has been received.

In step S516, the camera 100 transmits the live view data to the mobile phone 300. Note that although, in this embodiment, live view image data for one frame is included in the live view data transmitted at a time, this need not be the case.

In step S517, the camera 100 determines whether or not a live view data acquisition request has been newly received from the mobile phone 300, advances the processing to step S518 if it is determined that the request has been received, and advances the processing to step S519 if it is not determined that the request has been received. Here, the live view data acquisition request is transmitted from the mobile phone 300 in later-described step S713 in FIG. 7B.

In step S518, the camera 100 transmits the live view data to the mobile phone 300.

In step S519, the camera 100 determines whether or not a new zoom control command has been received from the mobile phone 300, advances the processing to step S520 if it is determined that a new zoom control command has been received, and advances the processing to step S521 if it is not determined that a new zoom control command has been received. Here, the zoom control command is transmitted from the mobile phone 300 in step S722 in FIG. 7B. In a state where the zoom adapter 200 is not attached, a control command is not generated from the mobile phone 300, and therefore, it is not determined in this step that a zoom control command has been received. Note that, in this embodiment, one or more of a zoom drive speed change command, zoom drive start command, and a zoom drive stop command are transmitted as the zoom control commands, and the zoom adapter executes processing corresponding to the command type (details will be described later). The zoom drive start command includes designation of a direction (telephoto-side or wide-angle side).

In step S520, the camera 100 transmits the zoom control command from the mobile phone 300 to the zoom adapter 200 via the interchangeable lens 150.

In step S521, the camera 100 determines whether or not an instruction to end remote shooting has been given, ends the processing shown in FIGS. 5A-1 and 5A-2 if it is determined that the instruction to end remote shooting has been given, and returns the processing to step S501 if it is not determined that the instruction to end remote shooting has been given. The instruction to end remote shooting may be given through the operation unit 115 in the camera 100, or may be received from the mobile phone 300.

Note that, in this embodiment, upon a change in the zoom position being detected, the camera 100 informs the mobile phone 300 of the zoom position change, and upon receiving the live view data request from the mobile phone 300, the camera 100 transmits the live view data to the mobile phone 300. However, for example, the camera 100 may transmit the live view data to the mobile phone 300 simultaneously with informing the mobile phone 300 of the zoom position change, without waiting for the live view data request.

Operation of Interchangeable Lens

Figure 5B:
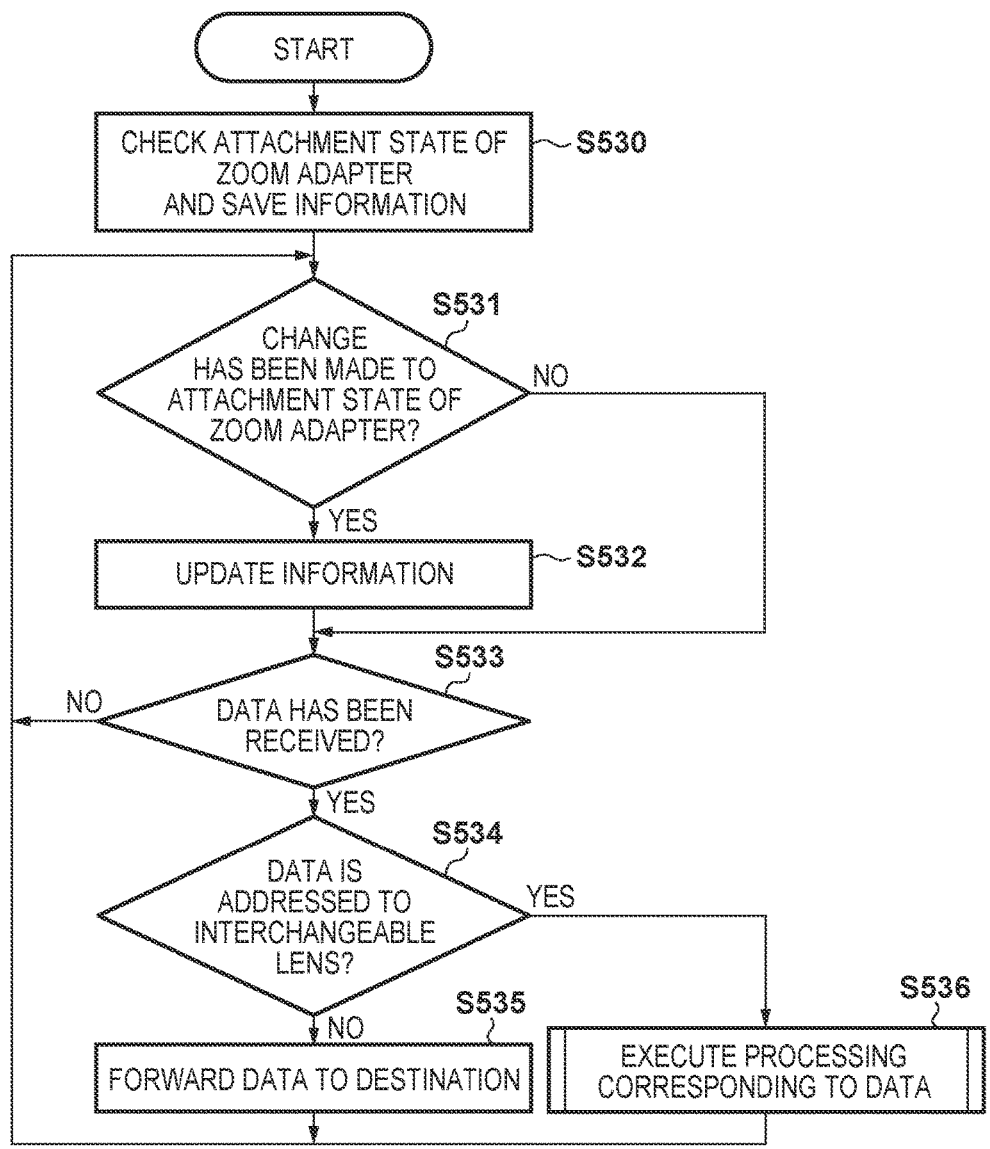
FIG. 5B is a flowchart related to an operation of an interchangeable lens according to an embodiment.

Next, operation of the interchangeable lens 150 will be described using a flowchart in FIG. 5B. The operation shown in FIG. 5B is started when the interchangeable lens 150 is attached to the camera 100.

In step S530, the interchangeable lens 150 checks the attachment state of the zoom adapter 200 (i.e. whether or not the zoom adapter 200 is attached), and saves information indicating the attachment state in the memory 153.

In step S531, the interchangeable lens 150 determines whether or not a change has been made to the attachment state of the zoom adapter 200, advances the processing to step S532 if it is determined that a change has been made, and advances the processing to step S533 if it is not determined that a change has been made.

In step S532, the interchangeable lens 150 updates the information indicating the attachment state saved in the memory 153. At this time, the interchangeable lens 150 may inform the camera 100 of the change in the attachment state of the zoom adapter 200.

In step S533, the interchangeable lens 150 determines whether or not data has been received from the camera 100 or the zoom adapter 200, advances the processing to step S534 if it is determined that the data has been received, and returns the processing to step S531 if it is not determined that the data has been received.

In step S534, the interchangeable lens 150 determines whether or not the received data is addressed to the interchangeable lens 150, advances the processing to step S536 if it is determined that the received data is addressed to the interchangeable lens, and advances the processing to step S535 if it is not determined that the received data is addressed to the interchangeable lens. As mentioned above, the destination of the received data can be determined from the information contained in the header of the data, for example, but may be determined by other methods, such as from the content of the data (e.g. command type).

In step S535, the interchangeable lens 150 forwards the data received in step S533 to the destination (the zoom adapter 200 or the camera 100), and returns the processing to step S531. Note that, in the case of forwarding the data, the data may be forwarded as-is, or may be forwarded after the transmission source of the data is changed to the interchangeable lens 150.

In step S536, the interchangeable lens 150 executes processing corresponding to the received data, and returns the processing to step S531. The processing performed in step S536 includes processing for transmitting characteristic information and optical information regarding the interchangeable lens 150, transmitting the zoom position information to the zoom adapter 200, and driving the focusing lens and the diaphragm according to the request from the camera 100, but is not limited thereto.

Operation of Zoom Adapter

Figure 6A:
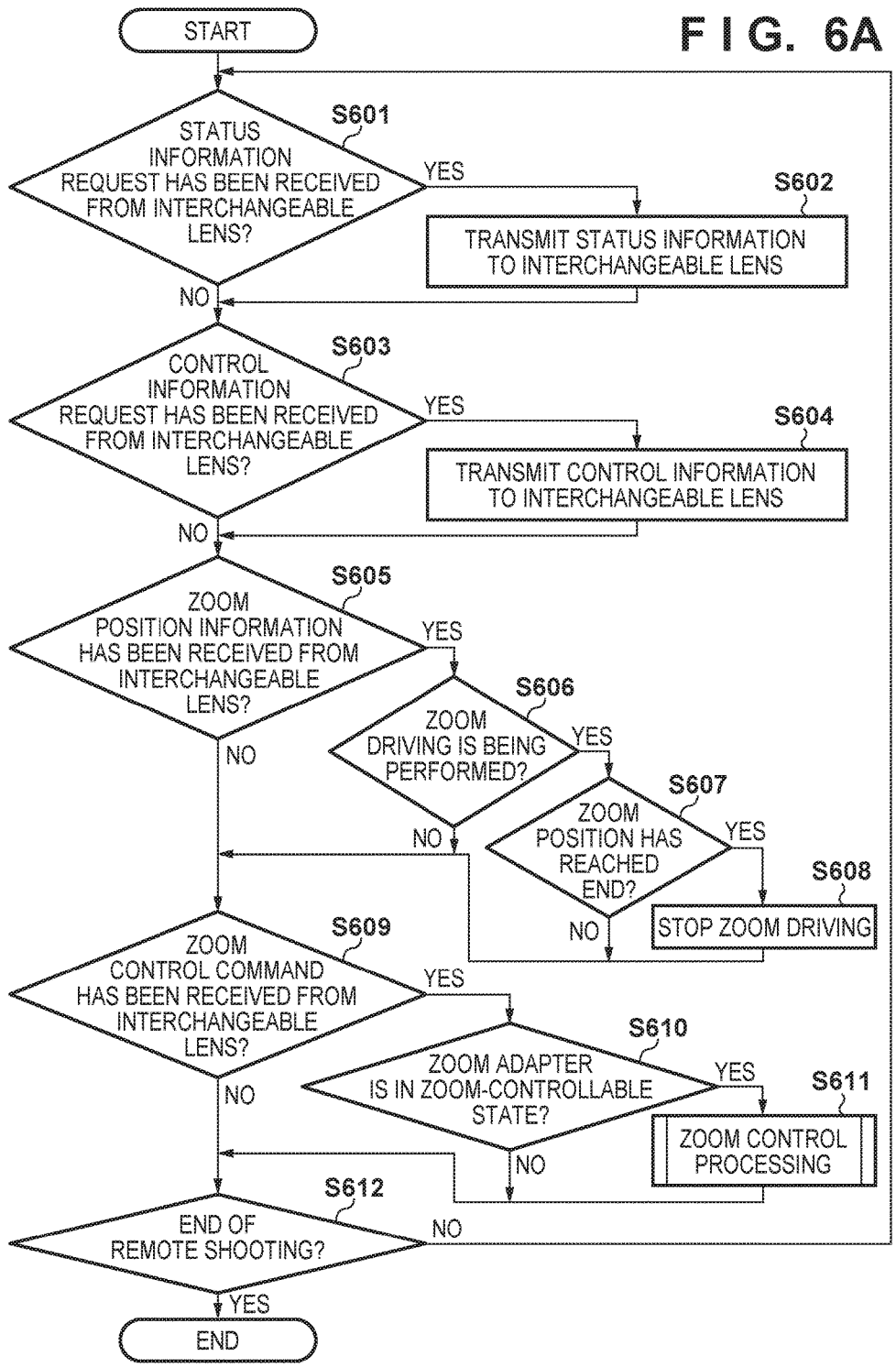
FIG. 6A is a flowchart related to an operation of the zoom adapter according to an embodiment.

Next, operation of the zoom adapter 200 will be described using a flowchart in FIG. 6A. The operation shown in FIG. 6A is executed in a state where the zoom adapter 200 is attached to the interchangeable lens 150.

In step S601, the zoom adapter 200 determines whether or not a status information request has been received from the interchangeable lens 150, advances the processing to step S602 if it is determined that the request has been received, and advances the processing to step S603 if it is not determined that the request has been received. The received status information request is transmitted from the camera 100 via the interchangeable lens 150 in step S502 in FIG. 5A-2.

In step S602, the zoom adapter 200 informs the interchangeable lens 150 of the status information. Note that if the transmission source of the status information request received from the interchangeable lens 150 is the camera 100, the zoom adapter 200 may transmit the status information to the camera 100 via the interchangeable lens 150. The zoom adapter 200 transmits the information to the transmission source of the request, and the same applies to other processing.

In step S603, the zoom adapter 200 determines whether or not a control information request has been received from the interchangeable lens 150, advances the processing to step S604 if it is determined that the request has been received, and advances the processing to step S605 if it is not determined that the request has been received. The received control information request is transmitted from the camera 100 via the interchangeable lens 150 in step S506 in FIG. 5A-2.

In step S604, the zoom adapter 200 transmits the control information to the interchangeable lens 150.

In step S605, the zoom adapter 200 determines whether or not the zoom position information has been received from the interchangeable lens 150, advances the processing to step S606 if it is determined that the zoom position information has been received, and advances the processing to step S609 if it is not determined that the zoom position information has been received. The received zoom position information is transmitted in accordance with an instruction from the camera 100 by the interchangeable lens 150 in step S510 in FIG. 5A-2.

In step S606, the zoom adapter 200 determines whether or not the zoom drive unit 206 is performing zoom drive, advances the processing to step S607 if it is determined that the zoom drive unit 206 is performing zoom drive, and advances the processing to step S609 if it is not determined that the zoom drive unit 206 is performing zoom drive.

In step S607, the zoom adapter 200 determines whether or not the current zoom position is the telephoto end or the wide-angle end, based on the zoom position information regarding the interchangeable lens 150. If it is determined that the zoom position of the interchangeable lens 150 is the telephoto end or the wide-angle end, the zoom adapter 200 advances the processing to step S608, and if it is not determined that the zoom position is the telephoto end or the wide-angle end, the zoom adapter 200 advances the processing to step S609.

In step S608, the zoom adapter 200 stops the zoom drive of the zoom drive unit 206.

In step S609, the zoom adapter 200 determines whether or not a zoom control command has been received from the interchangeable lens 150, advances the processing to step S610 if it is determined that the command has been received, and advances the processing to step S612 if it is not determined that the command has been received. The zoom control command received here is transmitted to the camera 100 by the mobile phone 300 in step S721 in FIG. 7B, and is transmitted by the camera 100 in step S520 in FIG. 5A-1.

In step S610, the zoom adapter 200 determines whether or not the zoom adapter 200 is in a controllable state, advances the processing to step S611 if it is determined that the zoom adapter 200 is in a controllable state, and advances the processing to step S612 if it is not determined that the zoom adapter 200 is in a controllable state. In this embodiment, it is determined that the zoom adapter 200 is in a controllable state, except for the case where zoom drive of the interchangeable lens cannot be performed, such as the case where the remaining capacity of the power supply is low, or the case where manual zoom has been set by the powered manual switch 209, but determination conditions are not limited thereto.

In step S611, the zoom adapter 200 performs zoom control processing. Here, the zoom control command received via the interchangeable lens 150 includes one or more of a zoom drive start command, a zoom drive stop command, and a zoom drive speed setting command, and the zoom adapter 200 performs processing corresponding to the type of the control command. Details of the control processing will be described later.

In step S612, the zoom adapter 200 determines whether or not an instruction to end remote shooting has been given, ends the processing shown in FIG. 6A if it is determined that the instruction to end remote shooting has been given, and returns the processing to step S601 if it is not determined that the instruction to end remote shooting has been given. The camera 100 may inform of the instruction to end remote shooting in step S521 in FIG. 5A-1, or a state where communication with the interchangeable lens 150 has not been performed for a fixed time may be regarded as the instruction to end remote shooting.

Details of the zoom control processing performed by the zoom adapter 200 in step S611 will be described using a flowchart in FIG. 6B.

In step S651, the zoom adapter 200 determines whether or not a drive command is included in the zoom control command received from the camera 100 via the interchangeable lens 150, advances the processing to step S652 if it is determined that the drive command is included, and advances the processing to step S657 if it is not determined that the drive command is included. Here, the drive command is a start command or a stop command.

In step S652, the zoom adapter 200 determines whether or not the zoom control command received from the camera 100 is a start command, advances the processing to step S653 if it is determined that the received zoom control command is a start command, and advances the processing to step S655 if it is not determined that the received zoom control command is a start command (i.e. if the received zoom control command is a stop command).

In step S653, the zoom adapter 200 reads out a set value of the zoom drive speed stored in the memory 203.

In step S654, the zoom adapter 200 starts to drive the zoom drive unit 206 in the direction designated in the start command at a driving speed according to the set value that is read out in step S653, and advances the processing to step S657.

On the other hand, in step S655, the zoom adapter 200 determines whether or not the zoom drive unit 206 is performing zoom drive, advances the processing to step S656 if it is determined that the zoom drive unit 206 is performing zoom drive, and advances the processing to step S657 if it is not determined that the zoom drive unit 206 is performing zoom drive.

In step S656, the zoom adapter 200 stops the driving of the zoom drive unit 206, and advances the processing to step S657.

Figure 6B:
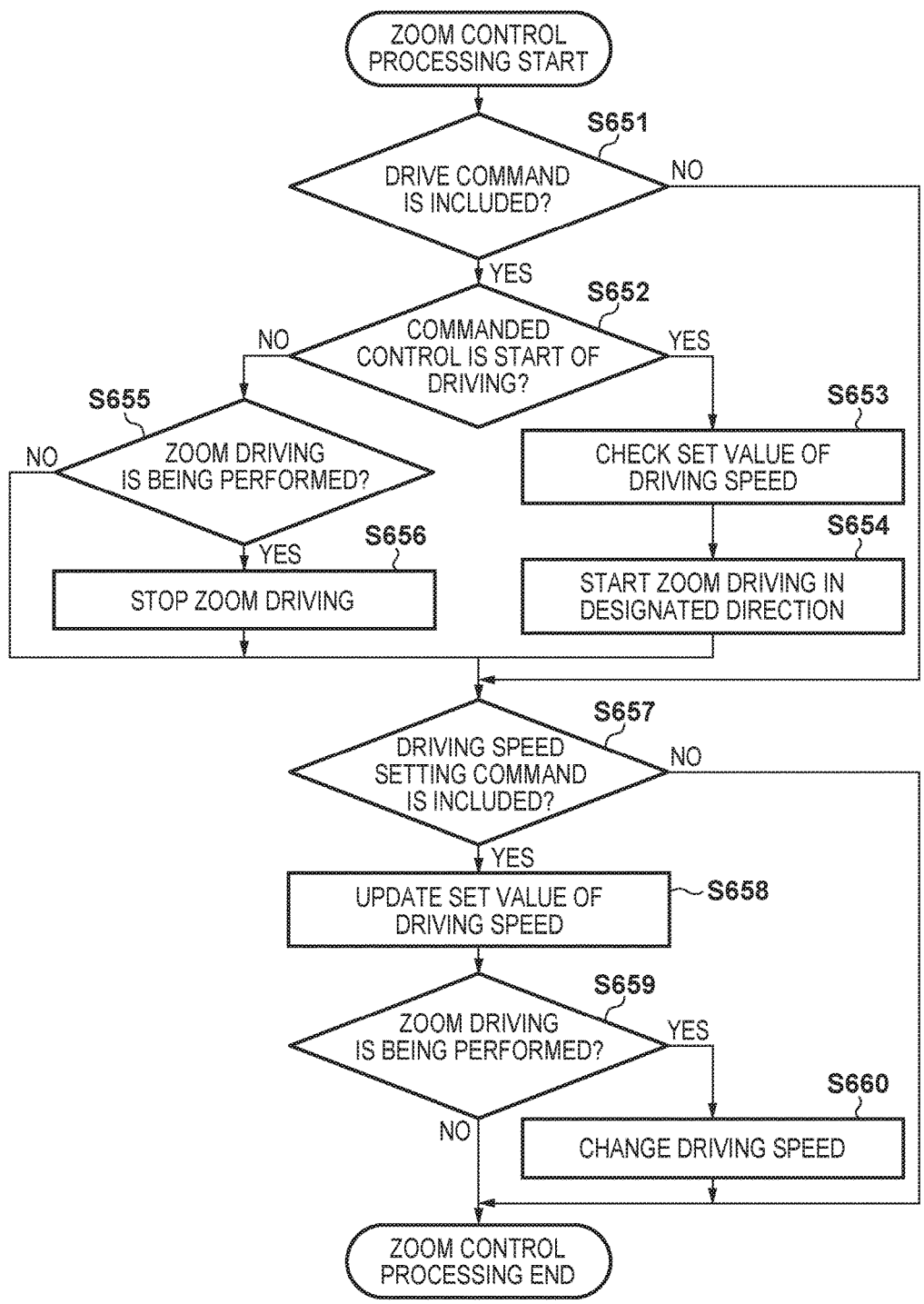
FIG. 6B is a flowchart related to an operation of the zoom adapter according to an embodiment.

In step S657, the zoom adapter 200 determines whether or not a zoom drive speed setting command is included in the zoom control command that has been received from the camera 100, advances the processing to step S658 if it is determined that the zoom drive speed setting command is included, and ends the processing in FIG. 6B if it is not determined that the zoom drive speed setting command is included.

In step S658, the zoom adapter 200 updates the set value of the zoom drive speed stored in the memory 203 to a value included in the setting command. Note that configuration may be taken so that the set value is not updated if the value included in the setting command is the same as the current set value.

In step S659, the zoom adapter 200 determines whether or not the zoom drive unit 206 is performing zoom drive, advances the processing to step S660 if it is determined that the zoom drive unit 206 is performing zoom drive, and ends the processing in FIG. 6B if it is not determined that the zoom drive unit 206 is performing zoom drive.

In step S660, the zoom adapter 200 changes the speed while continuing the driving of the zoom drive unit 206, and ends the zoom control processing shown in FIG. 6B.

Operation of Mobile Phone

Figure 7B:
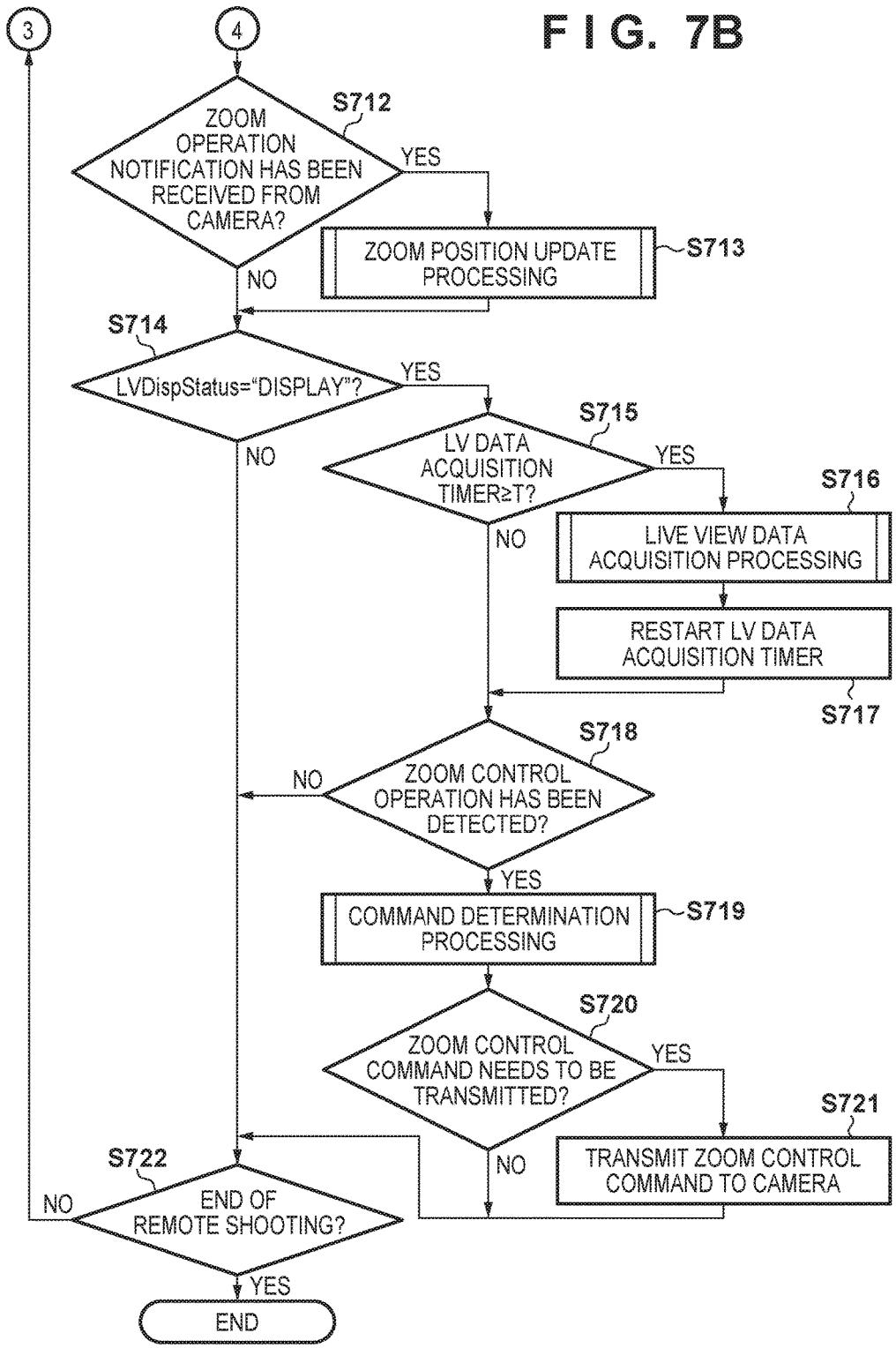

Next, operation of the mobile phone 300 will be described using flowcharts in FIGS. 7A and 7B. The operation shown in FIGS. 7A and 7B is started when communication between the mobile phone 300 and the camera 100 has been established, and an instruction to start a remote shooting operation has been given from the camera communication application on the mobile phone 300 to the camera 100, for example.

In step S701, the mobile phone 300 displays a remote shooting control screen on the display unit 306. Note that a configuration in which the display unit 306 is a touch panel display, and remote shooting is controlled through a touch operation made to the display unit 306 will be described below. Therefore, the display unit 306 displays a screen containing a GUI for touch operation. However, a configuration may be employed in which functions for controlling remote shooting are assigned to physical input devices such as numeric keys provided on the mobile phone 300, and a relationship regarding the assignment between the keys and the functions, in place of the GUI for touch operation, is displayed on the display unit 306. In the case of using a personal computer or the like in place of the mobile phone 300, a GUI may be operated with a combination of keyboards and a pointing device.

In step S702, the mobile phone 300 sets live view status (LVDispStatus) saved in the work memory 304, for example, to a value that indicates "displayed". The live view status indicates a display state ("displayed" or "not displayed") of the live view image on the mobile phone 300.

In step S703, the mobile phone 300 causes a live view data acquisition timer, which is used to regularly acquire a live view image from the camera 100, to start to count up.

In step S704, the mobile phone 300 determines whether or not information regarding a state of the zoom adapter 200 (the attachment state or the status information) has been received from the camera 100, advances the processing to step S705 if it is determined that the information has been received, and advances the processing to step S708 if it is not determined that the information has been received. The information regarding the attachment state or the status of the zoom adapter 200 received here is transmitted from the camera 100 in step S505 in FIG. 5A-2 or S512 in FIG. 5A-1.

In step S705, the mobile phone 300 determines whether or not the zoom adapter 200 is attached, based on the information regarding the attachment state of the zoom adapter 200, advances the processing to step S706 if it is determined that the zoom adapter 200 is attached, and advances the processing to step S707 if it is not determined that the zoom adapter 200 is attached.

In step S706, the mobile phone 300 performs processing at the time when the zoom adapter 200 is attached, based on the status of the zoom adapter 200 received from the camera 100. After the processing in step S706 at the time when the zoom adapter 200 is attached, the mobile phone 300 advances the processing to step S708. Note that details of step S706 will be described later using FIG. 9A.

On the other hand, if it is not determined in step S705 that the zoom adapter 200 is attached, in step S707, the mobile phone 300 causes the zoom control GUI to be not displayed on the display unit 306. Accordingly, if the zoom control GUI is already displayed on the display unit 306, the mobile phone 300 causes the zoom control GUI to be not displayed, and if the zoom control GUI is not displayed, the mobile phone 300 leaves the display unchanged.

In step S708, the mobile phone 300 determines whether or not a live view display switching operation has been detected, advances the processing to step S709 if it is determined that the operation has been detected, and advances the processing to step S713 if it is not determined that the operation has been detected. The live view display switching operation is an operation of switching between displaying and not displaying the live view image.

In step S709, the mobile phone 300 reflects the switching operation detected in the S708, in the value of the live view status.

In step S710, the mobile phone 300 determines whether or not the value of the live view status indicates "not displayed", advances the processing to step S711 if it is determined that the value indicates "not displayed", and advances the processing to step S712 if it is not determined that the value indicates "not displayed".

In step S711, the mobile phone 300 executes processing at the time when a live view is not displayed. Details will be described later using FIG. 9B.

In step S712, the mobile phone 300 determines whether or not a notification that the zoom operation was executed has been received from the camera 100, advances the processing to step S713 if it is determined that the notification has been received, and advances the processing to step S714 if it is not determined that the notification has been received.

In step S713, the mobile phone 300 executes zoom position update processing. Details will be described later.

In step S714, the mobile phone 300 determines whether or not the value of the live view status indicates "displayed", advances the processing to step S715 if it is determined that the value indicates "displayed", and advances the processing to step S722 if it is not determined that the value indicates "displayed".

In step S715, the mobile phone 300 determines whether or not the count of the live view data acquisition timer is greater than or equal to a given value T, advances the processing to step S716 if it is determined that the count is greater than or equal to the given value, and advances the processing to step S718 if it is not determined that the count is greater than or equal to the given value.

In step S716, the mobile phone 300 performs live view data acquisition processing, and advances the processing to step S717. Details of the live view data acquisition processing will be described later.

In step S717, the mobile phone 300 resets the live view data acquisition timer, and again causes it to start (restarts) to count up.

In step S718, the mobile phone 300 determines whether or not a zoom control operation has been detected, advances the processing to step S719 if it is determined that a zoom control operation has been detected, and advances the processing to step S722 if it is not determined that a zoom control operation has been detected. Here, the mobile phone 300 can determine that a zoom control operation has been detected when an operation made to the zoom control GUI through the touch panel provided on the display unit 306 or an operation made to a key, a button, or the like to which a zoom control operation is assigned is detected. Alternatively, the determination may be made in accordance with other conditions, such as an instruction made by audio input.

If the zoom adapter 200 is not attached to the interchangeable lens 150, or if the remote zoom control of the zoom adapter 200 is disabled, the zoom control GUI is not displayed, or is inoperable. Accordingly, it is not determined in step S718 that a zoom control operation has been detected.

In step S719, the mobile phone 300 performs, in accordance with the detected zoom control operation, processing for determining a zoom control command for the zoom adapter 200 that is to be transmitted to the camera 100 (command determination processing; details will be described later using FIG. 9A). In the command determination processing, the mobile phone 300 also determines whether or not a zoom control command needs to be transmitted. For example, the mobile phone 300 can determine that an impossible or invalid zoom control command does not need to be transmitted, as in the case where a zoom control operation is performed to zoom to the telephoto-side (wide-angle side) when the current zoom position is the telephoto end (wide-angle end).

In step S720, if, as a result of the command determination processing in step S719, it is determined that the zoom control command associated with the zoom control operation detected in step S718 is a command that needs to be transmitted, the mobile phone 300 advances the processing to step S721, and if it is not determined that the zoom control command is a command that needs to be transmitted, the mobile phone 300 advances the processing to step S722.

In step S721, the mobile phone 300 transmits, to the camera 100, the zoom control command regarding which the determination has been performed in step S719. Specific correspondence between the zoom control operations and the zoom control commands will be described later using FIGS. 11A to 11C and 12.

In step S722, the mobile phone 300 determines whether or not an instruction to end remote shooting has been given, ends the processing shown in FIGS. 7A and 7B if it is determined that the instruction to end remote shooting has been given, and returns the processing to step S704 if it is not determined that the instruction to end remote shooting has been given. The mobile phone 300 may be informed of the instruction to end remote shooting from the camera 100 in step S517 in FIG. 5A-1, or the instruction to end remote shooting may be an instruction to end the camera communication application given through a touch operation made to the display unit 306 or an operation made to the operation unit 305.

Next, the zoom position update processing executed by the mobile phone 300 in step S713 in FIG. 7B will be described with reference to a flowchart shown in FIG. 8.

In step S801, the mobile phone 300 transmits a live view data acquisition request to the camera 100.

In step S802, the mobile phone 300 receives live view data, which includes a live view image and zoom position information, from the camera 100. The live view image and the zoom position information received here are transmitted from the camera 100 in step S516 or S518 in FIG. 5A-1.

In step S803, the mobile phone 300 determines whether or not the value of the live view status indicates "displayed", advances the processing to step S804 if it is determined that the value indicates "displayed", and advances the processing to step S805 if it is not determined that the value indicates "displayed".

In step S804, the mobile phone 300 updates the display of the live view image region on the display unit 306, using the live view image received in step S802. The live view image region may be a part of the remote shooting screen displayed in step S701, for example.

In step S805, the mobile phone 300 determines whether or not the zoom control GUI is currently displayed on the display unit 306, advances the processing to step S806 if it is determined that the zoom control GUI is currently displayed, and ends the processing shown in FIG. 8 if it is not determined that the zoom control GUI is currently displayed. Note that, here, it may also be determined that the zoom control GUI is currently displayed in the case of the zoom control GUI displayed in a disabled state.

In step S806, the mobile phone 300 updates the display of the zoom position information regarding the interchangeable lens 150 on the zoom control GUI, and ends the processing shown in FIG. 8.

Thus, even in a state where the live view image is not displayed, upon receiving a notification that a zoom operation has been performed on the camera 100, the mobile phone 300 according to this embodiment makes a live view data request and acquires the live view data for a given number of frames (by unit of transmission). If the zoom control GUI is displayed, the display of the zoom position information regarding the interchangeable lens 150 on the zoom control GUI is updated using the information regarding the current zoom position included in the live view data. Therefore, the user can correctly grasp the current zoom position of the interchangeable lens 150 while suppressing battery consumption by causing the live view image to be not displayed to reduce data traffic.

Note that the mobile phone 300 according to this embodiment receives the live view data regardless of the live view status. Also, if the live view status indicates "displayed", the mobile phone 300 updates the currently-displayed live view image and the display of the zoom position, and if the live view status indicates "not displayed", the mobile phone 300 updates only the display of the zoom position. However, the mobile phone 300 may inform the camera 100 of the current live view status, and the camera 100 may change the data to be transmitted, in accordance with the live view status. That is to say, a configuration may be employed in which the camera 100 transmits the live view data if the received live view status indicates "displayed", and transmits only the current zoom position if the live view status indicates "not displayed".

Next, details of the processing executed by the mobile phone 300 in step S706 in FIG. 7A when the adapter is attached to the camera 100 will be described with reference to a flowchart shown in FIG. 9A.

In step S901, the mobile phone 300 determines whether or not the zoom adapter 200 is in a controllable state, based on the status information regarding the zoom adapter 200. If it is determined that the zoom adapter 200 is in a controllable state, the mobile phone 300 advances the processing to step S902, and if it is not determined that the zoom adapter 200 is in a controllable state, the mobile phone 300 advances the processing to step S903.

In step S902, the mobile phone 300 displays a zoom control GUI in an enabled state (operable state) on the display unit 306. This GUI may be displayed within or out of the remote shooting control screen displayed in step S701.

On the other hand, in step S903, the mobile phone 300 displays the zoom control GUI in a disabled state (inoperable state) on the display unit 306.

In step S904, the mobile phone 300 displays, on the display unit 306, a cause of inability to perform remote zoom control. The cause displayed here is based on the information regarding the status of the zoom adapter 200 received from the camera 100, and may be that the power supply voltage is insufficient, or that manual zoom is set, for example.

In step S905, the mobile phone 300 determines whether or not the control information regarding the zoom adapter 200 has been received from the camera 100, advances the processing to step S906 if it is determined that the control information has been received, and ends the processing shown in FIG. 9A if it is not determined that the control information has been received. The control information received here is transmitted from the camera 100 in step S509 in FIG. 5A-2.

In step S906, the mobile phone 300 updates the display of the zoom control GUI displayed on the display unit 306, in accordance with the control information. Specifically, the mobile phone 300 can change the display of the zoom drive speed in accordance with a set value of the current zoom drive speed included in the control information and change a settable value range based on a settable value list for the zoom drive speed, but the updating is not limited thereto. After updating the control information, the mobile phone 300 ends the processing shown in FIG. 9A.

Next, details of the processing executed by the mobile phone 300 in step S711 in FIG. 7A when the live view image is not displayed will be described with reference to a flowchart shown in FIG. 9B.

In step S1001, the mobile phone 300 turns off the display of the live view image region (i.e. causes the live view image to be not displayed).

In step S1002, the mobile phone 300 displays the zoom control GUI in a disabled state, disables zoom control through the zoom control GUI, and ends the processing in FIG. 9B.

Next, details of the live view data acquisition processing executed in step S716 in FIG. 7B will be described with reference to a flowchart shown in FIG. 10.

In step S1101, the mobile phone 300 transmits a live view data acquisition request to the camera 100.

In step S1102, the mobile phone 300 receives the live view data from the camera 100. The live view data received here is transmitted from the camera 100 in step S516 in FIG. 5A-1.

In step S1103, the mobile phone 300 updates the display of the live view image region on the display unit 306 using the live view image received in step S1102. The live view image region may be a part of the remote shooting screen displayed in step S701, for example.

Figure 10:
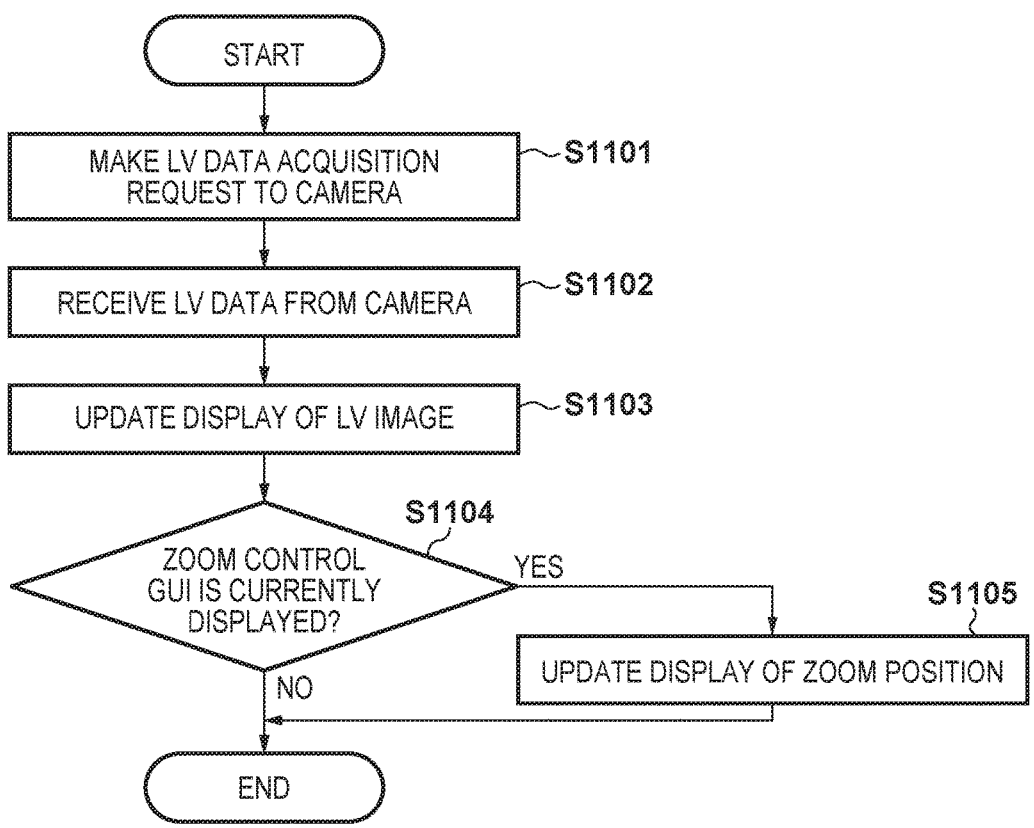
FIG. 10 is a flowchart related to processing at the time of acquiring live view data in FIG. 7B.

In step S1104, the mobile phone 300 determines whether or not the zoom control GUI is currently displayed on the display unit 306, advances the processing to step S1105 if it is determined that the zoom control GUI is currently displayed, and ends the processing shown in FIG. 10 if it is not determined that the zoom control GUI is currently displayed. Note that, here, it may also be determined that the zoom control GUI is currently displayed in the case of the zoom control GUI displayed in a disabled state.

In step S1105, the mobile phone 300 updates the display of the zoom position information regarding the interchangeable lens 150 on the zoom control GUI, and ends the processing shown in FIG. 10.

Description of Application: GUI

As mentioned above, in this embodiment, the remote shooting control from the mobile phone 300 is enabled by an operation made to the GUI displayed on the display unit 306 by the camera communication application operating on the mobile phone 300. A GUI operation can be executed by a touch operation if the display unit 306 is a touch display, or an operation made to a key or a pointing device if the display unit 306 is not a touch display.

Figure 11C:
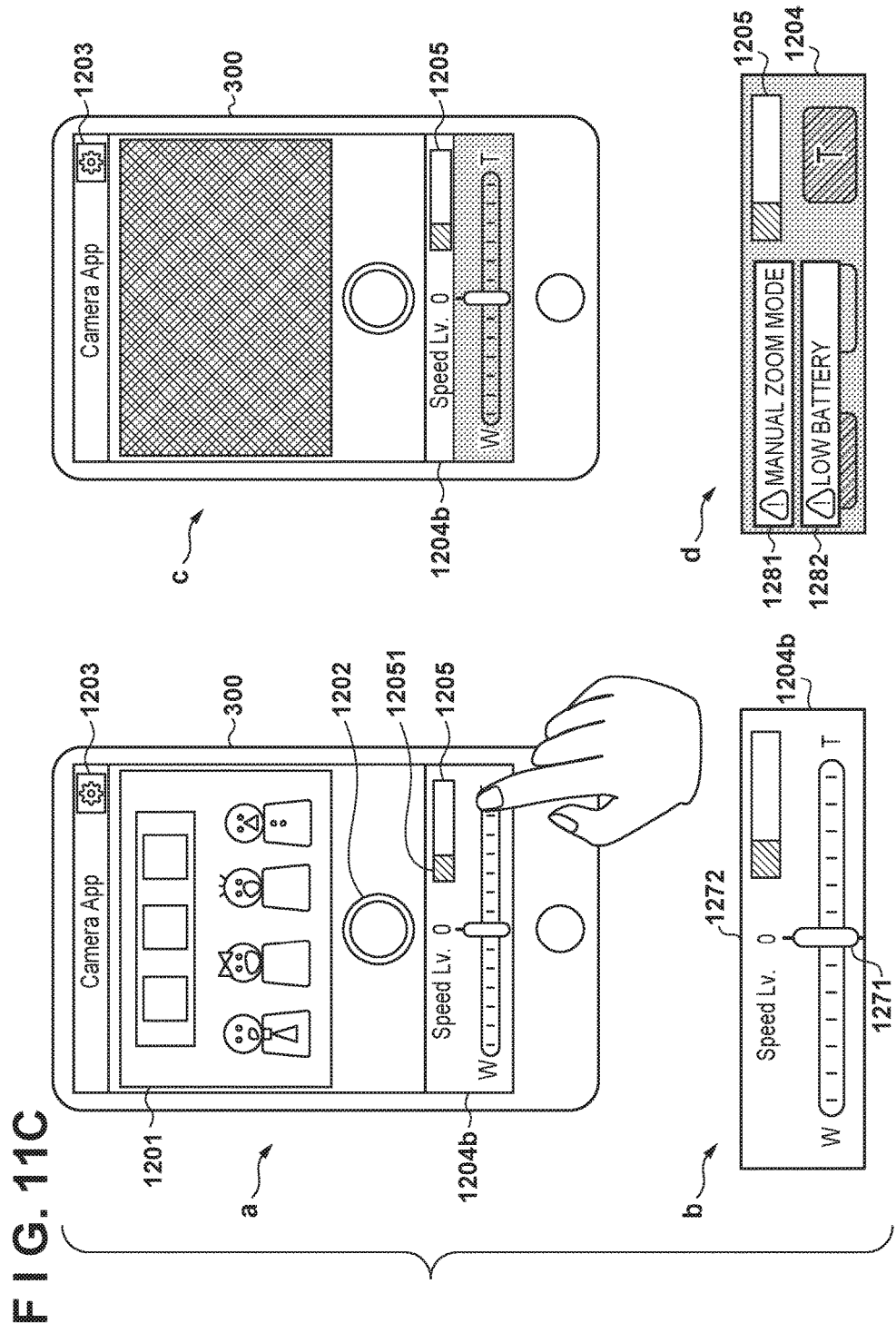
FIG. 11C is a diagram showing exemplary GUIs provided by the application that operates on the mobile phone according to an embodiment.

FIGS. 11A to 11C schematically show examples of the remote shooting screen and remote operation GUIs that are provided by the camera communication application in this embodiment. Here, as an example in the case where the display unit 306 on the mobile phone 300 is a touch display, a configuration in which the mobile phone 300 is a smartphone is described.

The remote shooting screen includes a live view image region 1201 and a menu button 1203, as well as a remote shooting button 1202 and a zoom control GUI 1204 that serve as remote operation GUIs.

The live view image that is regularly received from the camera 100 by the mobile phone 300 is displayed in the live view image region 1201, which thus functions as an external EVF of the camera 100. The display of the live view image region 1201 is updated in step S1103 in FIG. 10. A configuration may be employed in which a focus detecting position can be designated through a position-designating operation (e.g. a tap operation) made to the live view image region 1201. For example, upon detecting a tap operation made to the live view image region 1201, the mobile phone 300 can transmit, to the camera 100, a shooting preparation request including information regarding the position of this tap operation. The camera 100 can set a focus detection region based on the position information included in the shooting preparation request, and execute automatic focus detection and automatic exposure control.

The remote shooting button 1202 is a button for giving the camera 100 a shooting instruction. Upon a tap operation being made to the remote shooting button 1202, the mobile phone 300 transmits a shooting request to the camera 100. Upon receiving the shooting request, the camera 100 executes shooting processing in accordance with settings.

The menu button 1203 is a button for changing display settings of the application. In this embodiment, two types of GUIs are provided as the zoom control GUIs, and the mobile phone 300 provides a function of switching the GUIs through a menu screen displayed by pressing the menu button 1203. The mobile phone 300 also provides a function of switching between displaying and not displaying the live view image and other setting functions through the menu screen. Details will be described later.

The zoom control GUI 1204 is a GUI for remotely controlling the zoom adapter 200 from the camera communication application. As described using FIGS. 7, 9A, and 9B, the presence of the display of the zoom control GUI 1204 and the display mode (enabled/disabled) thereof change depending on whether or not the zoom adapter 200 is attached to the interchangeable lens 150, a change in the status of the zoom adapter 200, and the like.

A zoom position display region 1205 is a region for displaying a zoom position of the interchangeable lens 150, and in this embodiment, the current zoom position relative to the wide-angle end and the telephoto end is relatively indicated using a colored bar 12051. In this embodiment, the left end and the right end of the zoom position display region 1205 are assigned respectively to the wide-angle end and telephoto end, and a relative zoom position is indicated by the position of the bar 12051. Note that the method for displaying the zoom position is not limited thereto, and any methods that are based on the information regarding the zoom position transmitted from the camera 100 can be used, for example. For example, the current angle of view and the minimum and maximum angles of view may be displayed.

In this embodiment, two types of GUIs, namely a constant-speed zoom control GUI and a variable-speed zoom control GUI are provided as the zoom control GUI 1204, and a configuration in which the user can switch between these two types of GUIs when in use is employed. Note that FIG. 11A-*a* shows a state where the constant-speed zoom control GUI is displayed as the zoom control GUI 1204. Regarding the two types of zoom control GUIs, a description will be given below of the GUIs, an operation method thereof, control performed on the mobile phone 300, and an appropriate use case.

Description of Application: Constant-Speed Zoom control GUI

FIG. 11A-*b* is a schematic diagram showing an example of a constant-speed zoom control GUI 1204*a* serving as the zoom control GUI 1204. The constant-speed zoom control GUI 1204*a* is configured to set the driving speed and give instructions to start and stop zoom drive separately.

The constant-speed zoom control GUI 1204*a* has a zoom drive button (W) 1211 for giving an instruction of zoom drive to the wide-angle side, a zoom drive button (T) 1212 for giving an instruction of zoom drive to the telephoto-side, and a driving speed setting button 1213. Each zoom drive button constitutes an operation unit.

Upon the zoom drive button 1211 or 1212 being pressed, a zoom drive command is transmitted to the camera 100 while the pressing is continued, such that zoom drive in the direction corresponding to the pressed button is continuously performed at a driving speed displayed on the driving speed setting button 1213. Note that the initial value of the value displayed on the driving speed setting button 1213 is a current set value of the driving speed received from the camera 100 in step S710 in FIG. 7A.

FIG. 11A-*c* shows an example of a settable driving speed list 1221, which is displayed when the driving speed setting button 1213 is pressed on the constant-speed zoom control GUI 1204*a*. The current set value is displayed at the position of the driving speed setting button 1213, and settable values are selectably displayed in an up-down direction in a list form. The list 1221 is scrollable, and the user can designate a set value of the zoom drive speed by scrolling the list 1221 as necessary and tapping a desired set value. If the set value is changed, the value displayed on the driving speed setting button 1213 is also updated to the changed value.

The constant-speed zoom control GUI 1204*a* has a configuration suitable for performing zoom drive control at a fixed zoom drive speed that is set using the driving speed setting button 1213. The constant-speed zoom control GUI 1204*a* is a GUI that is suitable for the case where the user wants to zoom in on, or zoom out of, a person or an object at a fixed speed for presentation when recording a movie work or a music program, for example.

FIG. 11B-*a* schematically shows an example of a menu screen displayed on the mobile phone 300 when the menu button 1203 is pressed. The menu screen is displayed as a menu list 1231 in which selectable buttons are displayed in a list form, so as to overlap the zoom control GUI 1204. While the menu list 1231 is displayed, the mobile phone 300 disables operation to the remote shooting screen, and grays out the display of the live view image region 1201 and the zoom control GUI 1204 (i.e. displays them in a disabled state).

The menu list 1231 includes a live view display switching button 1231*a*, a setting button 1231*b*, and a cancel button 1231*c* for ending the display of the menu list 1231, but may include other buttons. The live view display switching button 1231*a* is a button for giving an instruction to switch between enabling and disabling (ON and OFF) of the live view display. The setting button 1231*b* is a button for giving an instruction to display a screen for configuring other settings. Settable content (i.e. content opposite to current settings) is displayed on the live view display switching button 1231*a*, and is displayed, in the example in FIG. 11B-*a*, as a button for disabling (turning off) the live view display since the live view display is currently enabled (ON).

If the live view display switching button 1231*a* in the menu list 1231 is selected in the state shown in FIG. 11B-*a*, the mobile phone 300 stops the display of the live view image. Also, the mobile phone 300 disables operation to the zoom control GUI 1204 and displays the zoom control GUI 1204 in a disabled state. This state is shown in FIG. 11B-*b*.

As described regarding FIG. 8, in this embodiment, even in a state where the live view display is OFF, if a zoom operation to the interchangeable lens 150 is performed on the camera 100, the current zoom position information is acquired, and the display of the zoom position display region 1205 is updated. Therefore, even if the zoom position of the interchangeable lens 150 is changed on the camera 100 in a state where the live view display is OFF, a correct current zoom position can be checked in the zoom position display region 1205. Note that although this embodiment has described an example of graying out the display of the GUIs as the display in a disabled state for indicating that the GUIs are in an inoperable state, any other display methods may be employed. For example, an "unable to control" message or the like may be displayed so as to overlap the GUIs.

FIG. 11B-*c* shows an example of the menu list 1231 that is displayed when the menu button 1203 is pressed in a state where the live view display is OFF as shown in FIG. 11B-*b*. In a state where the live view display is OFF, the live view display switching button 1231*a* is displayed as a button for turning on the live view display. Accordingly, upon the live view display switching button 1231*a* being selected, the mobile phone 300 turns on the live view display, restores the screen display of the application to the state shown in FIG. 11A-*a*, and enables operation to the zoom control GUI 1204. Thus, the live view image is continuously displayed in the live view image region 1201.

Figures 2, 12A:
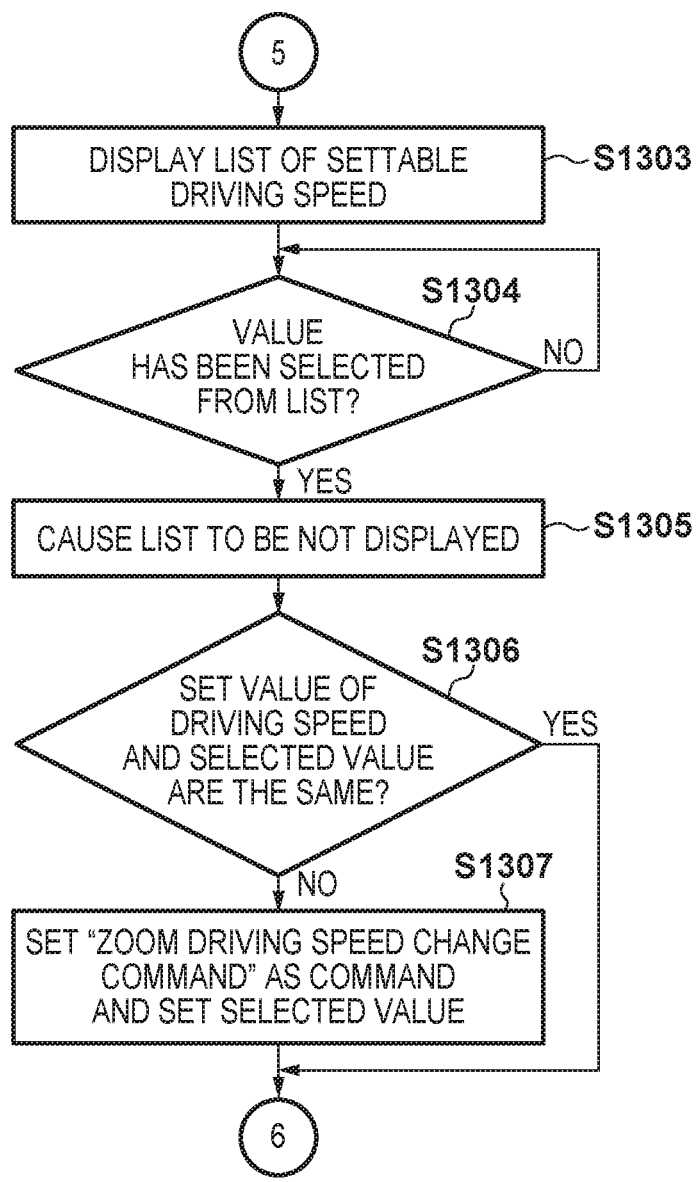

FIGS. 12A-1 and 12A-2 are flowcharts related to the command determination processing performed in step S719 in FIG. 7B when the mobile phone 300 determines in step S718 that an operation made to the constant-speed zoom control GUI 1204*a* has been detected. An operation made to the constant-speed zoom control GUI 1204*a* is one of the pressing of the driving speed setting button 1213, a start or stop of the pressing of the zoom drive button (W) 1211, and a start or stop of the pressing of the zoom drive button (T) 1212. If it is determined that one of these operations has been performed, the mobile phone 300 executes the command determination processing shown in FIGS. 12A-1 and 12A-2. The mobile phone 300 determines in step S720 in FIG. 7B whether or not a command needs to be transmitted, based on the command that is set at the end of the command determination processing.

In step S1301, the mobile phone 300 sets "transmission unnecessary" as an initial value of the command that is to be transmitted to the camera 100.

In step S1302, the mobile phone 300 determines whether or not the operation has been made to the driving speed setting button 1213, advances the processing to step S1303 if it is determined that the operation has been made to the driving speed setting button 1213, and advances the processing to step S1308 if it is not determined that the operation has been made to the driving speed setting button 1213.

In step S1303, the mobile phone 300 displays the settable driving speed list 1221 as shown in FIG. 11A-*c*.

In step S1304, the mobile phone 300 waits for a value in the list 1221 displayed in step S1303 to be selected, and advances the processing to step S1305 if a value selecting operation is detected.

In step S1305, the mobile phone 300 causes the list 1221 displayed in step S1303 to be not displayed.

In step S1306, the mobile phone 300 determines whether or not the set value selected from the list 1221 is the same as the set value that is currently set for the zoom adapter 200, and advances the processing to step S1307 if it is not determined that the values are the same.

In step S1307, the mobile phone 300 sets a zoom drive speed change command as a command that is to be transmitted to the camera 100, sets the set value selected from the list 1221 as a parameter of the zoom drive speed change command, and ends the command determination processing.

On the other hand, if it is determined in step S1306 that the set value selected from the list 1221 is the same as the set value that is currently set for the zoom adapter 200, the mobile phone 300 ends the command determination processing without changing the set command (i.e. in a state where "transmission unnecessary" is set). This is because a request to set the zoom drive speed does not need to be made.

In step S1308, the mobile phone 300 determines whether the detected operation is a start of the pressing or an end of the pressing, and branches the processing. Note that step S1308 is executed when the zoom drive button (W) 1211 or the zoom drive button (T) 1212 has been operated. If it is determined that the detected operation is a start of the pressing, the mobile phone 300 advances the processing to step S1309. If the detected operation is an end of the pressing of the operated item, the mobile phone 300 advances the processing to step S1314.

In step S1309, the mobile phone 300 determines the zoom drive button on which the operation has been detected, advances the processing to step S1310 if it is determined that the operation has been detected on the zoom drive button (T) 1211, and advances the processing to step S1312 if it is determined that the operation has been detected on the zoom drive button (W) 1212.

In step S1310, the mobile phone 300 determines whether or not the zoom position of the interchangeable lens 150 is the telephoto end, ends the command determination processing if it is determined that the zoom position is the telephoto end, and advances the processing to S1311 if it is not determined that the zoom position is the telephoto end. Note that it can be determined whether or not the current zoom position is the telephoto end based on the information received from the camera 100 in step S714 in FIG. 7B. If the current zoom position is the telephoto end, the interchangeable lens 150 cannot be further driven to the telephoto-side, and therefore, the mobile phone 300 ends the command determination processing without changing the set command (i.e. in a state where "transmission unnecessary" is set).

In step S1311, the mobile phone 300 sets a zoom drive start command as the command that is to be transmitted to the camera 100, sets the telephoto-side as a driving direction parameter of the zoom drive start command, and ends the command determination processing.

On the other hand, if pressing of the zoom drive button (W) is started, in step S1312, the mobile phone 300 determines whether or not the zoom position of the interchangeable lens 150 is the wide-angle end, ends the command determination processing if it is determined that the zoom position is the wide-angle end, and advances the processing to step S1313 if it is not determined that the zoom position is the wide-angle end. Note that it can be determined whether or not the current zoom position is the wide-angle end based on the information received from the camera 100 in step S716 in FIG. 7B (step S802 in FIG. 8). If the current zoom position is the wide-angle end, the zoom position cannot be further driven to the wide-angle side, and therefore, the mobile phone 300 ends the command determination processing without changing the set command (i.e. in a state where "transmission unnecessary" is set).

In step S1311, the mobile phone 300 sets a zoom drive start command as the command that is to be transmitted to the camera 100, sets the wide-angle side as a driving direction parameter of the zoom drive start command, and ends the command determination processing.

If it is determined in step S1308 that the operation made to the zoom drive button is not a start of the pressing (i.e. in the case of an end of the pressing), in step S1314, the mobile phone 300 sets a zoom drive stop command as the command that is to be transmitted to the camera 100, and ends the command determination processing.

The command that is set through the above command determination processing is transmitted to the camera 100 in step S721 in FIG. 7B unless "transmission unnecessary" is set. Then, the command is transmitted from the camera 100 to the zoom adapter 200 through the interchangeable lens 150, and zoom drive according to the command is executed. Thus, a zoom operation can be remotely made to the interchangeable lens 150, which is a manual zoom lens, from the mobile phone 300.

Description of Application: Variable-Speed Zoom Control GUI

Next, a description will be given of the variable-speed zoom control GUI, which is provided as the other zoom control GUI 1204. FIG. 11C-*a* shows an example of a remote shooting screen in the case where a variable-speed zoom control GUI 1204*b* is provided as the zoom control GUI 1204, and the same reference numerals are assigned to the same constituent elements as those in FIG. 11A-*a*.

FIG. 11C-*b* is a schematic diagram showing an example of the variable-speed zoom control GUI 1204*b*. The variable-speed zoom control GUI 1204*b* is configured such that the driving speed is set and instructions to start and stop zoom drive are given through operations made to one GUI component (here, a slider).

The variable-speed zoom control GUI 1204*b* has a zoom drive slider 1271 (operation unit). The mobile phone 300 displays the zoom drive slider 1271, which can be moved in the left-right direction, with the center of a movable area thereof as an initial position (0). Upon a selected state of the zoom drive slider 1271 being canceled, the mobile phone 300 restores the display position of the zoom drive slider 1271 to the initial position. The zoom drive slider 1271 may be restored to the initial position while being moved at a given speed, or the zoom drive slider 1271 may be jumped to the initial position.

The zoom direction (telephoto-side or wide-angle side) is designated by the moving direction (operation direction) of the zoom drive slider 1271 relative to the initial position, and the driving speed is designated by the moving distance (operation amount) thereof from the initial position. For example, an operation of moving (dragging) the zoom drive slider 1271 from the center to the right by one mark corresponds to the designation of zoom drive to the telephoto-side at a driving speed 1. The mobile phone 300 transmits, to the camera 100, a drive command for achieving zoom drive control according to the position of the zoom drive slider 1271. If the zoom drive slider 1271 is moved to the initial position, the mobile phone 300 transmits the zoom drive stop command to the camera 100.

Marks are provided in the movable range of the zoom drive slider 1271, and each mark corresponds to one of the settable driving speeds. Every time the zoom drive slider 1271 moves across one mark, the set value of the zoom drive speed is changed. If, in step S906 in FIG. 9A, the content of the settable value list for the zoom drive speed has been changed, the mobile phone 300 updates the display of the number and the position of marks in accordance with the changed list. As a method for changing the position of marks, (a total number of settable values×2+1) marks may be displayed at equal intervals with the movable area of the zoom drive slider 1271 as a fixed length. Also, a configuration may be employed in which the interval between adjacent marks is fixed and the size of the movable area of the zoom drive slider 1271 is changed so as to be able to display (a total number of settable values×2+1) marks. Note that configuration may be taken so that the settable values and the position of the marks are not displayed at a correct scale. Also, configuration may be taken so that mark position information is used only in internal processing, and the marks are not displayed.

Zoom drive is stopped when the zoom drive slider 1271 is at the initial position, and therefore, if the driving speed is configured to change every time the zoom drive slider 1271 moves across a mark, the driving speed increases or decreases by one step at a time. Accordingly, if the zoom drive slider 1271 is moved from the initial position, zoom drive is always started from the driving speed 1. For example, if the user wants to change the set value of the driving speed by two or more steps at a time, a zoom control command corresponding to the position at the time when the zoom drive slider 1271 entered a state of not moving across any mark for a certain time period may be transmitted to the camera 100.

The mobile phone 300 displays the current set value of the driving speed on a display region 1272 on the variable-speed zoom control GUI 1204*b*. If the zoom drive slider 1271 is in a range within one mark from the initial position, the mobile phone 300 displays 0, which indicates a stop of zoom drive, as the zoom drive speed.

With the variable-speed zoom control GUI 1204*b*, the zoom drive speed can be successively changed by operating the zoom drive slider 1271. For example, it is conceivable that, in the case of zooming while viewing the live view image and tracking a moving subject, the variable-speed zoom control GUI 1204*b*, which is capable of readily changing the zoom speed in accordance with the speed and direction of the movement of the subject, is suitable.

FIG. 11C-*c* shows an exemplary screen display at the time when the live view display is turned off from the menu list in the case where the variable-speed zoom control GUI 1204*b* is provided. Since zoom control using the variable-speed zoom control GUI 1204*b* is disabled, the variable-speed zoom control GUI 1204*b* is displayed in a disabled state, similarly to FIG. 11B-*b*. If a change in the zoom position of the interchangeable lens 150 has occurred on the camera 100 in a state where the live view display is OFF, the display of the zoom position display region 1205 is updated, as in the case where the constant-speed zoom control GUI 1204*a* is provided.

Upon the live view display switching button 1231*a* being selected from the menu list displayed by pressing the menu button 1203 in FIG. 11C-*c*, the display state in FIG. 11C-*a* is restored.

FIG. 12B is a flowchart related to the command determination processing performed in step S719 in FIG. 7B when the mobile phone 300 determines in step S718 that an operation has been made to the variable-speed zoom control GUI 1204*b*. An operation made to the variable-speed zoom control GUI 1204*b* is one of a movement of the zoom drive slider 1271 and an end of the movement thereof (cancellation of a selected state of the zoom drive slider 1271). If it is determined that one of these operations has been performed, the mobile phone 300 executes the command determination processing shown in FIG. 12B. The mobile phone 300 determines in step S721 in FIG. 7B whether or not a command needs to be transmitted, based on the command that is set at the end of the command determination processing.

In step S1321, the mobile phone 300 determines whether or not the detected operation is an end of the sliding, advances the processing to step S1322 if it is determined that the detected operation is an end of the sliding, and advances the processing to step S1323 if it is not determined that the detected operation is an end of the sliding.

In step S1322, the mobile phone 300 sets a zoom drive stop command as a command that is to be transmitted to the camera 100, and ends the command determination processing shown in FIG. 12B.

In step S1323, the mobile phone 300 determines whether or not the position of the zoom drive slider 1271 has moved across a mark as a result of the detected operation, advances the processing to step S1324 if it is determined that the position has moved across a mark, and advances the processing to step S1329 if it is not determined that the position has moved across a mark.

In step S1329, the mobile phone 300 sets "transmission unnecessary" as the command that is to be transmitted to the camera 100, and ends the command determination processing.

In step S1324, the mobile phone 300 determines the value of the zoom drive speed to be displayed in the display region 1272, and updates the display. For example, the mobile phone 300 can determine the set value of the changed zoom drive speed, based on the current position of the zoom drive slider 1271, the position of each mark, and the list of the settable values of the driving speed. For example, if the zoom drive slider 1271 has moved across a second mark on the right side from the center and is located in an area that does not reach a third mark, the mobile phone 300 determines a second lowest value in the settable value list as the zoom drive speed to be set, and updates the display of the display region 1272. Note that, if the zoom drive slider 1271 is located in a central part (i.e. an area that does not extend beyond any mark from the initial position), the mobile phone 300 displays 0 in the display region 1272.

In step S1325, the mobile phone 300 determines whether or not the zoom drive slider 1271 is located in a central part, advances the processing to step S1322 if it is determined that the zoom drive slider 1271 is located in the central part, and advances the processing to step S1326 if it is not determined that the zoom drive slider 1271 is located in the central part.

In step S1326, the mobile phone 300 sets a zoom drive speed change command as the command that is to be transmitted to the camera 100, and sets the zoom drive speed displayed in the display region 1272 as a parameter of the zoom drive speed change command.

In step S1327, the mobile phone 300 determines whether or not the zoom drive slider 1271 is located at a position other than the central part (i.e. has moved to a position separate from the initial position by one or more marks). If it is determined that the zoom drive slider 1271 is located at a position other than the central part, the mobile phone 300 advances the processing to step S1328, and ends the command determination processing if it is not determined that the zoom drive slider 1271 is located at a position other than the central part.

In step S1328, the mobile phone 300 sets a zoom drive start command, in addition to the zoom drive speed change command that is set in step S1324, as the commands to be transmitted to the camera 100. Also, the mobile phone 300 sets the telephoto-side as the parameter of the zoom drive start command if the position of the zoom drive slider 1271 is on the right side of the initial position, sets the wide-angle side thereas if the position of the zoom drive slider 1271 is on the left side, and ends the command determination processing.

The command that is set through the above command determination processing is transmitted to the camera 100 in step S721 in FIG. 7B unless "transmission unnecessary" is set. Then, the command is transmitted from the camera 100 to the zoom adapter 200 through the interchangeable lens 150, and zoom drive according to the command is executed. Thus, a zoom operation can be remotely made to the interchangeable lens 150, which is a manual zoom lens, from the mobile phone 300.

Note that, regarding the marks used in the processing in FIG. 12B, the position thereof need only be able to be used for comparison, and the marks do not need to be displayed, as mentioned above. Although the zoom drive stop command and the zoom drive start command have been described as different commands, the zoom drive start command may be sent with a value indicating stop set as a parameter thereof. Alternatively, a zoom drive speed change command to set the driving speed to 0 may be used as the zoom drive stop command.

Display of Zoom Control GUI when Zoom Adapter 200 Cannot be Controlled

FIG. 11C-*d* shows an example of the display in a disabled state in step S903 and the causes displayed in step S904 when the zoom adapter 200 cannot be controlled (in the case of NO in step S901 in FIG. 9A) in a state where the zoom adapter 200 is attached to the interchangeable lens 150.

In the example shown in FIG. 11C-*d*, an inoperable state (disabled state) is visually indicated by graying out the display of the zoom control GUI 1204. Messages 881 and 882 indicating the causes of the uncontrollability that have been determined from the status information received in step S704 in FIG. 7A are displayed so as to overlap the zoom control GUI 1204. In this example, the manual zoom mode being set in the zoom adapter 200 and a low remaining capacity of the battery of the zoom adapter 200 are displayed as the causes of the inability to control the zoom adapter 200.

As described above, according to this embodiment, if live view display is set to OFF in a communication apparatus that remotely operates an image capture apparatus to which a zoom lens is attached, zoom control from the communication apparatus is disabled. Therefore, it is possible to prevent the occurrence of a difference between an actual zoom position and a zoom position assumed by a user of the communication apparatus due to the angle of view being unintentionally changed while the live view display is stopped.

Furthermore, since zoom position information is acquired if a notification that the zoom position has been changed by an operation made on the image capture apparatus side is given, the communication apparatus can correctly grasp the zoom position on even if the live view display is set to OFF. Therefore, the user of the communication apparatus can find a correct zoom position even if the zoom position is changed on the image capture apparatus side, while reducing power consumption related to communication of the live view image by turning off the live view display.

Second Embodiment

Next, a second embodiment will be described. A remote shooting system according to the second embodiment is common to the first embodiment except for operation of the mobile phone. In this embodiment, functional configurations of the digital camera, the zoom adapter, and the mobile phone may be common to the first embodiment, and therefore, a description of the constituent elements will be omitted, and operation of the mobile phone will be described.

Figure 13A:
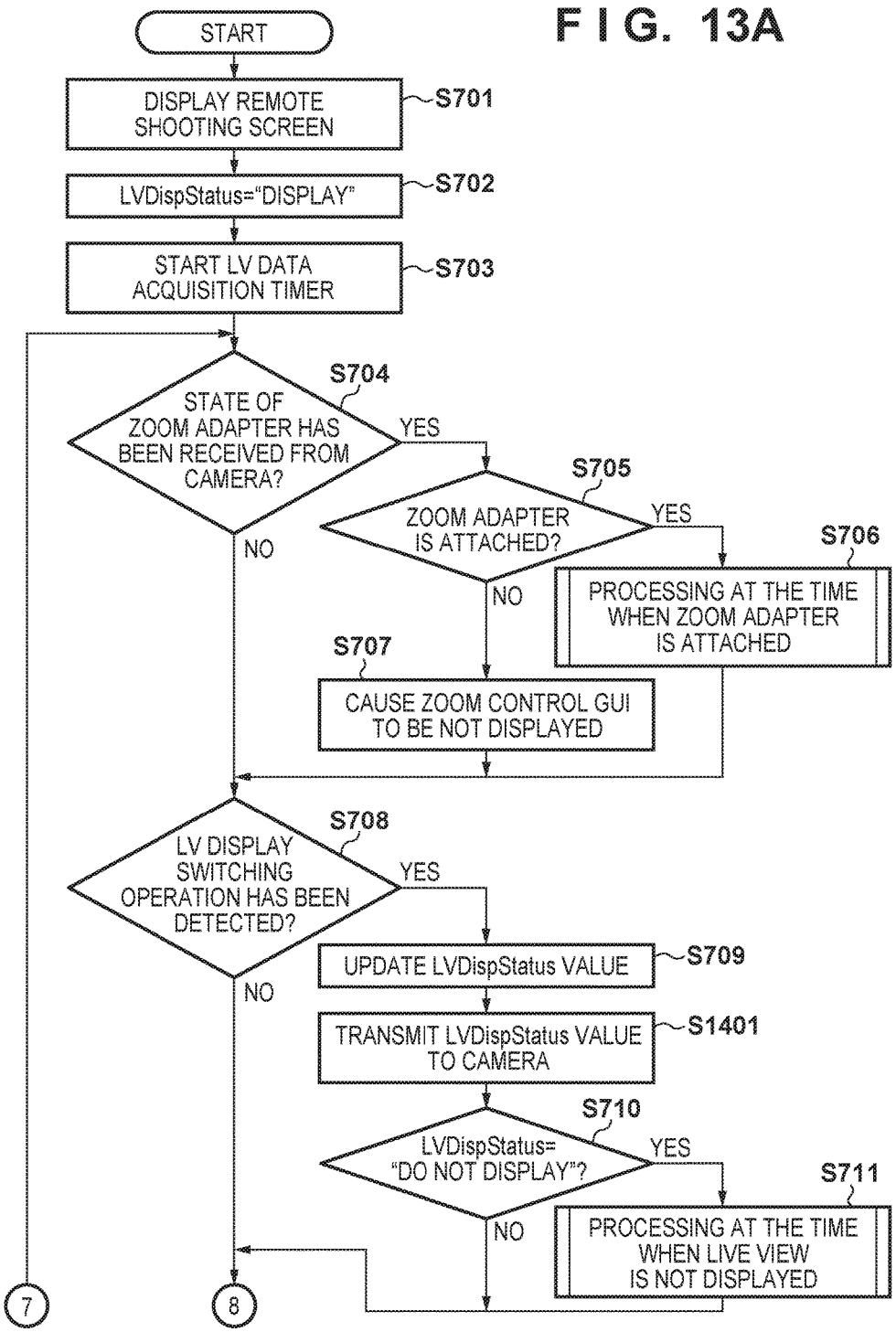
FIGS. 13A to 13C are flowcharts related to operation of a mobile phone according to a second embodiment.
Figure 13B:
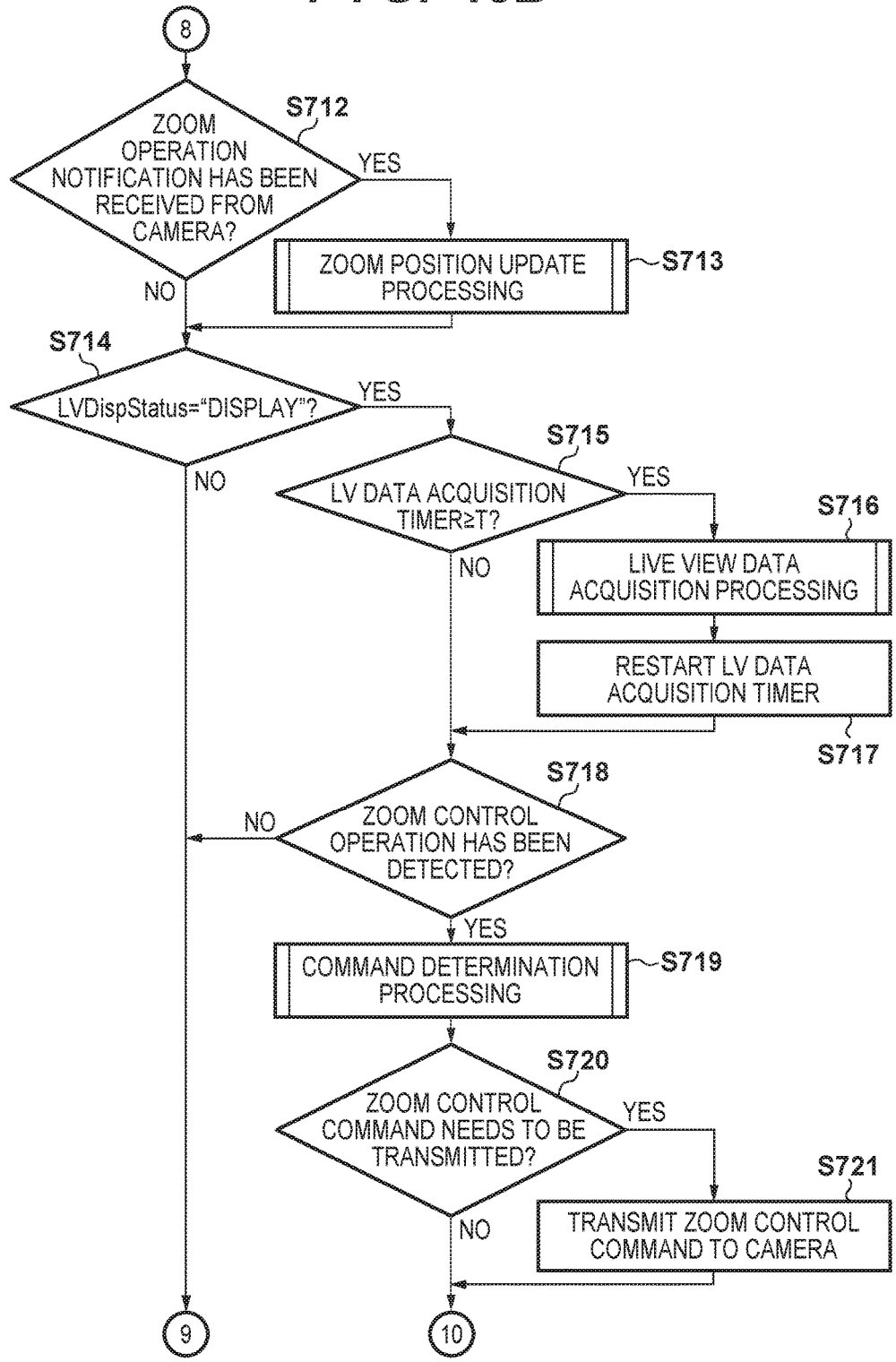
Figure 13C:
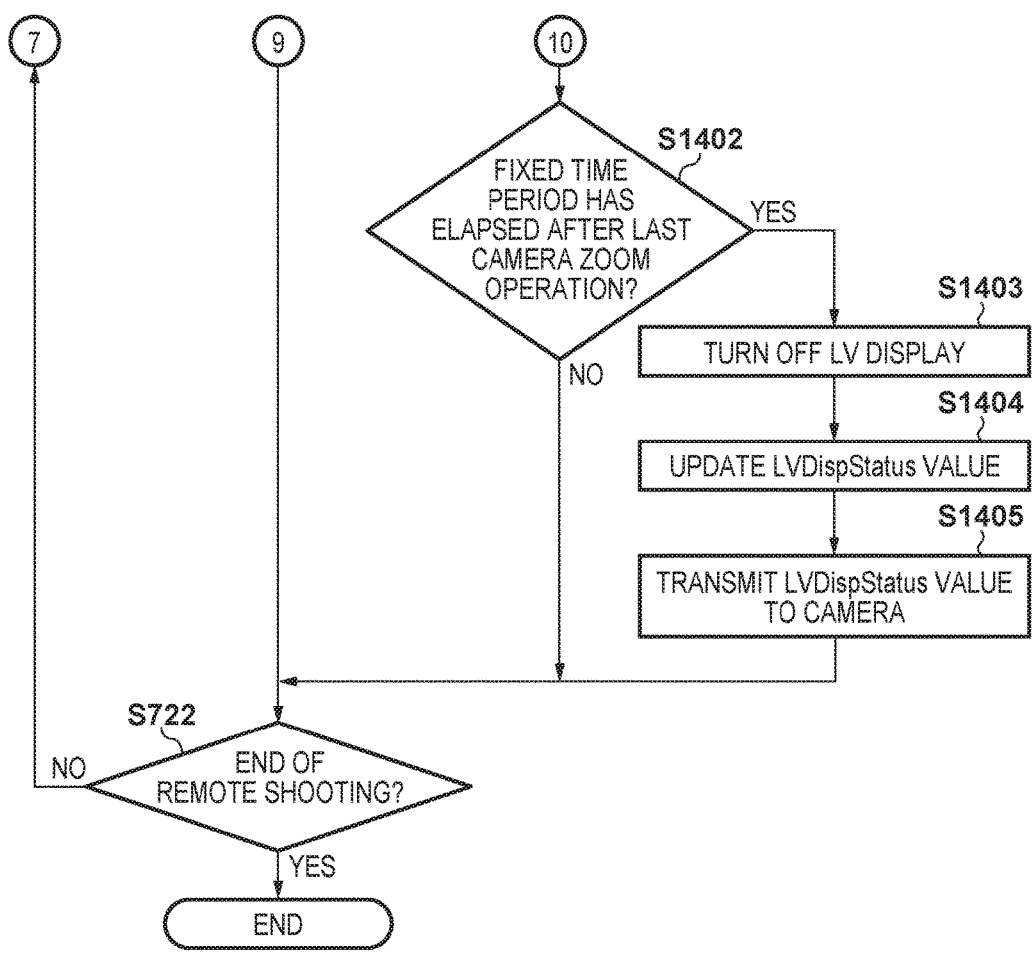

Operation of the mobile phone 300 according to the second embodiment will be described using flowcharts shown in FIGS. 13A to 13C. Note that, in FIGS. 13A to 13C, steps in which operations common to the first embodiment are performed will be assigned the same reference numerals as those in FIGS. 7A and 7B, and redundant descriptions will be omitted. The mobile phone 300 according to this embodiment reflects, in step S709, the live view display switching operation detected in step S708 in the value of the live view status, and thereafter transmits, in step S1401, the changed value of the live view status to the camera 100.

After it is determined in step S714 that the value of the live view status indicates "displayed" and the processing in step S715 and subsequent steps is performed, the mobile phone 300 executes step S1402 before executing step S722. In step S1402, the mobile phone 300 determines whether or not a fixed time period has elapsed since a zoom operation was last performed through an operation made to the camera 100 or remote operation using the mobile phone 300. If it is determined that the fixed time period has elapsed, the mobile phone 300 advances the processing to step S1403, and if it is not determined that the fixed time period has elapsed, the mobile phone 300 advances the processing to step S722. Here, the time when the zoom operation was last performed is the time when a timer is started in later-described step S1501 in FIG. 14.

In step S1403, the mobile phone 300 turns off the live view display (i.e. causes the live view display to be not displayed). In steps S1404 and S1405, similar to steps S709 and S1401, the mobile phone 300 updates the value of the live view status, transmits the updated value to the camera 100, and advances the processing to step S722.

Thus, if a zoom operation is not performed for a fixed time period, the mobile phone 300 according to this embodiment automatically turns off the live view display, and can thereby suppress power consumption.

Next, the zoom position update processing executed by the mobile phone 300 according to this embodiment in step S713 in FIG. 13B will be described using a flowchart shown in FIG. 14. Note that, in FIG. 14, steps in which operations common to the first embodiment are performed will be assigned the same reference numerals as those in FIG. 8, and redundant descriptions will be omitted.

After receiving the live view data from the camera 100 in step S802, in step S1501, the mobile phone 300 starts a zoom operation timer. Since the zoom position update processing is executed if the zoom position of the interchangeable lens 150 has changed, the zoom operation timer started in step S1501 measures a time that has elapsed since the zoom position of the interchangeable lens 150 last changed. The zoom operation timer may be achieved as a clock signal counting operation routine of the mobile phone 300, or may be achieved as a hardware counter.

If the elapsed time can be measured, configuration may be taken so that a timer is not used. For example, in step S1501, the mobile phone 300 may store the current time instead of starting the timer. If the zoom operation timer has already been started at the time of execution of step S1501, the mobile phone 300 restarts (resets) the zoom operation timer.

In step S803, the mobile phone 300 determines whether or not the value of the live view status indicates "displayed", advances the processing to step S804 if it is determined that the value indicates "displayed", and advances the processing to step S1502 if it is not determined that the value indicates "displayed". A description of the processing in step S804 will be omitted.

In step S1502, the mobile phone displays the live view image in the live view image region 1201 (FIGS. 11A to 11C) based on the live view data received from the camera 100 in step S802. That is to say, if the mobile phone 300 is informed of a change in the zoom position in a state where the live view display is OFF, the mobile phone 300 automatically turns on the live view display.

In step S1503, the mobile phone 300 enables the display of the zoom control GUI 1204 that has been displayed in a disabled state, and enables operation to the zoom control GUI 1204.

In step S1504, the mobile phone 300 updates the value of the live view status to a value that indicates "displayed".

In step S805 onward, the mobile phone 300 operates similarly to the first embodiment.

As described above, upon receiving a zoom operation notification from the camera 100 in a state where the live view display is OFF, the mobile phone 300 according to this embodiment automatically turns on the live view display. Therefore, even if the live view display has been turned off, if the zoom position is changed, the user of the mobile phone 300 can immediately check the changed angle of view.

If the zoom position has not changed for a fixed time period in a state where the live view display is ON, the mobile phone 300 according to this embodiment automatically turns off the live view display. Therefore, battery consumption due to the live view display can be automatically saved.

Note that, if the mobile phone 300 has automatically turned off the live view display, the user can again turn on the live view display by operating the menu button 1203 to display the menu list 1231, and selecting the live view display switching button 1231a. Alternatively, a configuration may be employed in which, if the mobile phone 300 has automatically turned off the live view display, the live view display can again be turned on with an easier method than in the case where the user actively turns off the live view display. For example, a configuration may be employed in which the live view display can again be turned on by performing a tap operation (click operation) to the live view image region 1201. In the case where the mobile phone 300 has an orientation sensor or an acceleration sensor, a configuration may be employed in which the live view display can again be turned on through an operation of shaking the mobile phone 300 or changing the angle of a housing thereof.

Although exemplary embodiments of the present invention have been described above, the present invention is not limited to the configurations described in these embodiments, and can be modified or altered within the scope of the invention. At least portions of different embodiments may be combined for implementation.

Other Embodiments

Although the above embodiments have described the zoom position that serves as an example of the information included in the live view data, other information can also be treated similarly to the zoom position. Examples of such other information include the position and size of a focus detection region, the detection result, position, and size of a subject region, a current in-focus distance, and the like. Strict consistency between the live view image and parameter values is required with respect to the above information, and it is therefore desirable that the information is attached to the live view data and transmitted. In contrast, rather than attaching the above information to the live view image, parameters of which mobile phone is informed by the camera may be provided in other commands. For example, since strict consistency between the live view image and parameter values is not required with respect to values of the aperture, shutter speed, exposure, white balance, ON/OFF of a flash, and the like, the mobile phone may be informed of these values using other commands.

According to the present invention, the communication apparatus can grasp latest values of information regarding a state or settings that may be changed through an operation made on the camera 100 side, such as the information regarding the zoom position, and information that may change with a change over time of a subject, such as information regarding the in-focus distance, even in a state where the live view display is OFF.

Also, the above embodiments have described a configuration in which a remote powered zoom operation of a manual zoom lens attached to a camera is achieved using a zoom adapter. However, the present invention is also applicable to a camera that has a built-in powered zoom lens or to which a powered zoom lens is attached.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-257323, filed on Dec. 28, 2015, which is hereby incorporated by reference herein in its entirety.

What is claimed is:

1. A communication apparatus capable of controlling an image capture apparatus separate from the communication apparatus, comprising:
   one or more processors; and
   at least one memory coupled to the one or more processors, the at least one memory having instructions stored thereon which, when executed by the one or more processors, cause the communication apparatus to:
   receive live image data, which is data of a live image captured by the image capture apparatus, wherein information regarding a predetermined parameter related to a capturing of the live image is added to the live image data;
   display a value that is based on the information regarding the predetermined parameter received as a current value of the predetermined parameter of the image capture apparatus;
   accept an instruction to change the value of the predetermined parameter;
   restrict reception of the live image data; and
   inform a user that the instruction to change the value of the predetermined parameter is restricted, if the reception of the live image data is restricted.

2. The communication apparatus according to claim 1, wherein execution of the instructions further causes the communication apparatus to restrict the reception of the live image data by not making a request for the live image data to the image capture apparatus.

3. The communication apparatus according to claim 1, wherein if the reception of the live image data is restricted, the execution of the instructions further causes the communication apparatus to receive the information regarding the predetermined parameter that is not attached to the live image data.

4. The communication apparatus according to claim 1, wherein the predetermined parameter is related to a zoom position of a lens of the image capture apparatus.

5. The communication apparatus according to claim 1, wherein the predetermined parameter is related to focus of a lens attached to the image capture apparatus.

6. The communication apparatus according to claim 1, wherein execution of the instructions further causes the communication apparatus to display the received live image data and the value that is based on the information regarding the predetermined parameter added to the live image data together on a given screen.

7. The communication apparatus according to claim 6, wherein execution of the instructions further causes the communication apparatus to sequentially updates the live image data and the value that is based on the information regarding the predetermined parameter displayed on the given screen, based on the live image data that is sequentially received.

8. The communication apparatus according to claim 1, wherein execution of the instructions further causes the communication apparatus to receive, separately from the live image data, a second parameter related to the capturing of the live image, the second parameter being different from the predetermined parameter.

9. The communication apparatus according to claim 8, wherein the second parameter includes at least one of an aperture, a shutter speed, exposure, white balance, and a flash setting.

10. The communication apparatus according to claim 1, wherein the communication apparatus is a mobile phone.

11. The communication apparatus according to claim 1, wherein a driver device for driving a zoom mechanism in a lens of the image capture apparatus can be attached to and detached from the lens.

12. The communication apparatus according to claim 11, wherein execution of the instructions further causes the communication apparatus to further receive driver device information indicating an attachment state of the driver device, and
if the driver device information indicates that the driver device is attached to the lens of the image capture apparatus, the instruction to change the value of the predetermined parameter can be accepted, and if the driver device information indicates that the driver device is not attached to the lens of the image capture apparatus, the instruction to change the value of the predetermined parameter cannot be accepted.

13. A communication apparatus capable of controlling an image capture apparatus separate from the communication apparatus, comprising:
one or more processors; and
at least one memory coupled to the one or more processors, the at least one memory having instructions stored thereon which, when executed by the one or more processors, cause the communication apparatus to:
receive live image data, which is data of a live image captured by the image capture apparatus, wherein information regarding a predetermined parameter related to a captured of the live image is added to the live image data received;
display a value that is based on the predetermined parameter received as a current value of the predetermined parameter of the image capture apparatus;
accept an instruction to change the value of the predetermined parameter; and
restrict reception of the live image data,
wherein if the instruction to change the value of the predetermined parameter is accepted, receive the live image data even if the reception of the live image data is restricted.

14. The communication apparatus according to claim 13, wherein the predetermined parameter is related to a zoom position of a lens of the image capture apparatus.

15. The communication apparatus according to claim 13, wherein the predetermined parameter is related to focus of a lens attached to the image capture apparatus.

16. The communication apparatus according to claim 13, wherein execution of the instructions further causes the communication apparatus to display the live image data received and the value that is based on the information regarding the predetermined parameter added to the live image data together on a given screen.

17. The communication apparatus according to claim 16, wherein execution of the instructions further causes the communication apparatus to sequentially updates the live image data and the value that is based on the information regarding the predetermined parameter displayed on the given screen, based on the live image data that is sequentially received.

18. The communication apparatus according to claim 13, wherein execution of the instructions further causes the communication apparatus to receive, separately from the live image data, a second parameter related to the capturing of the live image, the second parameter being different from the predetermined parameter.

19. The communication apparatus according to claim 18, wherein the second parameter includes at least one of an aperture, a shutter speed, exposure, white balance, and a flash setting.

20. The communication apparatus according to claim 13, wherein the communication apparatus is a mobile phone.

21. The communication apparatus according to claim 13, wherein a driver device for driving a zoom mechanism in a lens of the image capture apparatus can be attached to and detached from the lens.

22. The communication apparatus according to claim 21, wherein execution of the instructions further causes the communication apparatus to further receive driver device information indicating an attachment state of the driver device, and
if the driver device information indicates that the driver device is attached to the lens of the image capture apparatus, the instruction to change the value of the predetermined parameter can be accepted, and if the driver device information indicates that the driver device is not attached to the lens of the image capture apparatus, the instruction to change the value of the predetermined parameter cannot be accepted.

23. A method for controlling a communication apparatus capable of controlling an image capture apparatus separate from the communication apparatus, the method comprising:
receiving live image data, which is data of a live image captured by the image capture apparatus, wherein information regarding a predetermined parameter related to a capturing of the live image is added to the received live image data;
displaying a value that is based on the information regarding the predetermined parameter as a current value of the predetermined parameter of the image capture apparatus; and
informing a user that an instruction to change the value of the predetermined parameter is restricted, if the receiving of the live image data is restricted.

24. A method for controlling a communication apparatus capable of controlling an image capture apparatus separate from the communication apparatus, the method comprising:
receiving live image data, which is data of a live image captured by the image capture apparatus, wherein information regarding a predetermined parameter related to a capturing of the live image is added to the received live image data; and displaying a value that is based on the information regarding the predetermined parameter as a current value of the predetermined parameter of the image capture apparatus, wherein, in the receiving of the live image data generated by the image capture apparatus is started if an instruction to change the value of the predetermined parameter is accepted, even if the reception of the live image data is restricted.

25. A non-transitory computer-readable storage medium for storing a computer-executable program, the program causing, when executed in a computer provided in a communication device, the computer to perform a method comprising:

receiving live image data, which is data of a live image captured by an image capture apparatus separate from the communication device, wherein information regarding a predetermined parameter related to a capturing of the live image is added to the live image data received;

displaying a value that is based on the information regarding the predetermined parameter received as a current value of the predetermined parameter of the image capture apparatus;

accepting an instruction to change the value of the predetermined parameter;

restricting reception of the live image data; and informing a user that the instruction to change the value of the predetermined parameter is restricted, if the reception of the live image data is restricted.

26. A non-transitory computer-readable storage medium for storing a computer-executable program, the program causing, when executed in a computer provided in a communication device, the computer to perform a method comprising:

receiving live image data, which is data of a live image captured by an image capture apparatus separate from the communication device, wherein information regarding a predetermined parameter related to a capturing of the live image is added to the live image data received;

displaying a value that is based on the information regarding the predetermined parameter received as a current value of the predetermined parameter of the image capture apparatus;

accept accepting an instruction to change the value of the predetermined parameter; and restricting reception of the live image data, wherein if the instruction to change the value of the predetermined parameter is accepted, start to receive the live image data generated by the image capture apparatus even if the reception of the live image data is restricted.

* * * * *